United States Patent
Herson et al.

(10) Patent No.: US 10,715,714 B2
(45) Date of Patent: Jul. 14, 2020

(54) MACHINE LEARNING-BASED DEVICE PLACEMENT AND CONFIGURATION SERVICE

(71) Applicant: Verizon Patent and Licensing Inc., Arlington, VA (US)

(72) Inventors: Andrew W. Herson, Albany, CA (US); Domonkos Huszar, Budapest (HU); Istvan S. Horvath, Budapest (HU); Christopher Kennedy, San Jose, CA (US); Csaba Rekeczky, Monte Sereno, CA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 99 days.

(21) Appl. No.: 16/162,482

(22) Filed: Oct. 17, 2018

(65) Prior Publication Data

US 2020/0128171 A1    Apr. 23, 2020

(51) Int. Cl.
*H04N 5/232*    (2006.01)
*G06N 7/00*    (2006.01)
*G06N 20/00*    (2019.01)

(52) U.S. Cl.
CPC ........... *H04N 5/23206* (2013.01); *G06N 7/00* (2013.01); *G06N 20/00* (2019.01); *H04N 5/232933* (2018.08)

(58) Field of Classification Search
CPC ......... H04N 5/23206; H04N 5/232933; G06N 20/00; G06N 7/00
See application file for complete search history.

(56) References Cited

U.S. PATENT DOCUMENTS

| | | | | |
|---|---|---|---|---|
| 10,579,650 B2 * | 3/2020 | Chaintron | ............... | G06F 16/29 |
| 2003/0095119 A1 * | 5/2003 | Jeong | ................... | H04N 13/117 |
| | | | | 345/419 |
| 2006/0244817 A1 * | 11/2006 | Harville | .................. | H04N 7/15 |
| | | | | 348/14.08 |
| 2008/0291279 A1 * | 11/2008 | Samarasekera | .. | G08B 13/19693 |
| | | | | 348/159 |
| 2013/0120451 A1 * | 5/2013 | Sasaki | ....................... | G06T 5/50 |
| | | | | 345/633 |

(Continued)

*Primary Examiner* — James M Pontius

(57) ABSTRACT

A method, a device, and a non-transitory storage medium are described in which a machine learning-based device placement and configuration service is provided. The machine learning-based device placement and configuration system uses regression models calculated from installation and performance data. The regression model includes data associated with sites at which video cameras were previously installed and tested for detection accuracy levels possibly associated with a service area. With these generated models, information about the physical space, and desired performance criteria, designers optimize camera number, camera placement, and geo-location camera parameters. The device placement and configuration service may find an optimal camera placement and geo-location camera parameter set which satisfy certain criteria. The geo-location parameters include position, height, heading, pitch, and roll. Subsequent to the installation of the video cameras using the calculated geo-location parameters, the system may verify accuracy of detection of the service area, and update the regression model.

20 Claims, 19 Drawing Sheets

(56) References Cited

U.S. PATENT DOCUMENTS

| | | | |
|---|---|---|---|
| 2014/0347450 A1* | 11/2014 | Han | B60R 1/00 |
| | | | 348/48 |
| 2017/0264890 A1* | 9/2017 | Gorilovsky | G03B 37/04 |
| 2018/0359427 A1* | 12/2018 | Choi | H04N 5/2224 |
| 2019/0182469 A1* | 6/2019 | Sakakima | G06T 7/00 |
| 2019/0385373 A1* | 12/2019 | Mittleman | G06T 15/30 |
| 2020/0068188 A1* | 2/2020 | Maeda | H04N 13/243 |

* cited by examiner

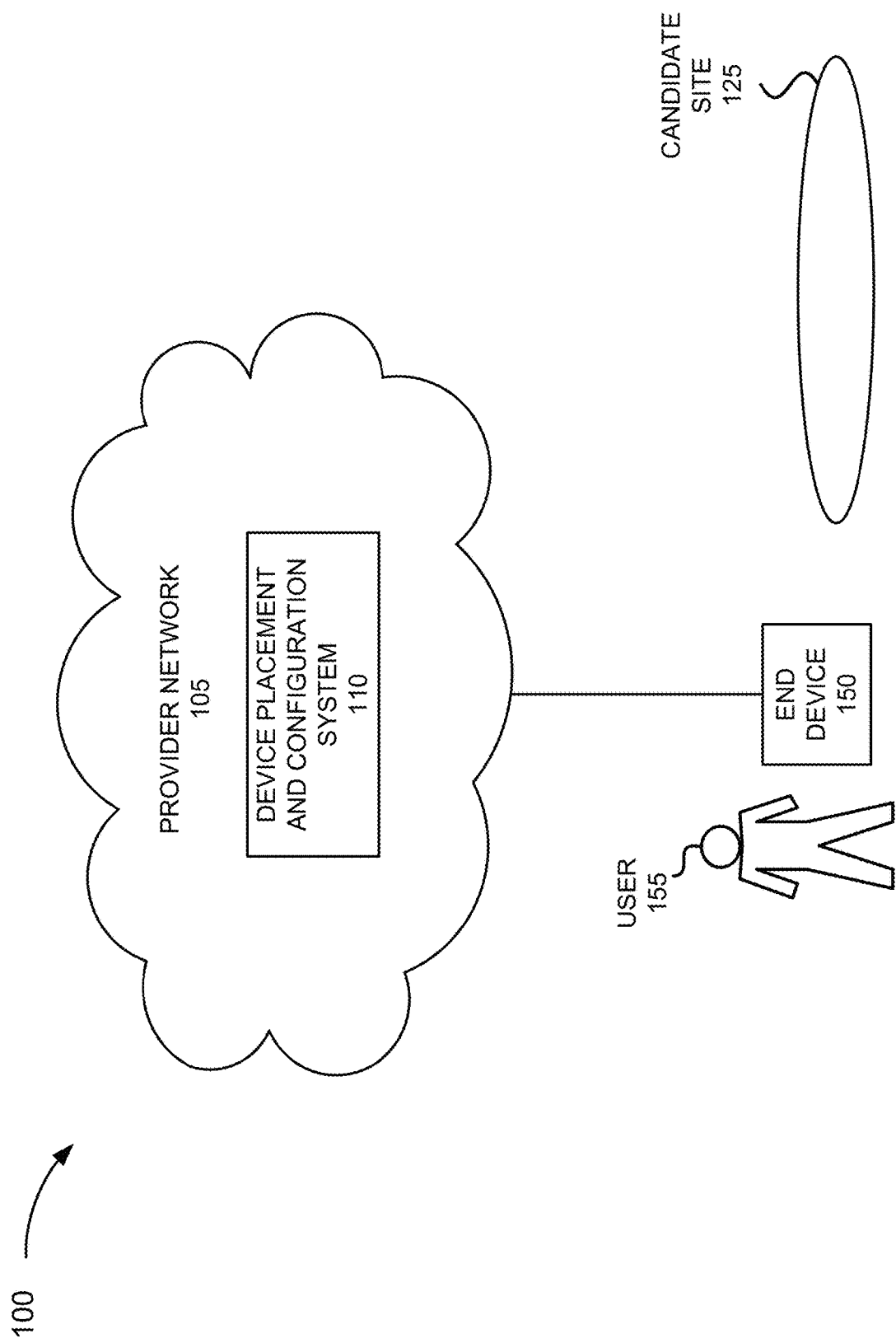

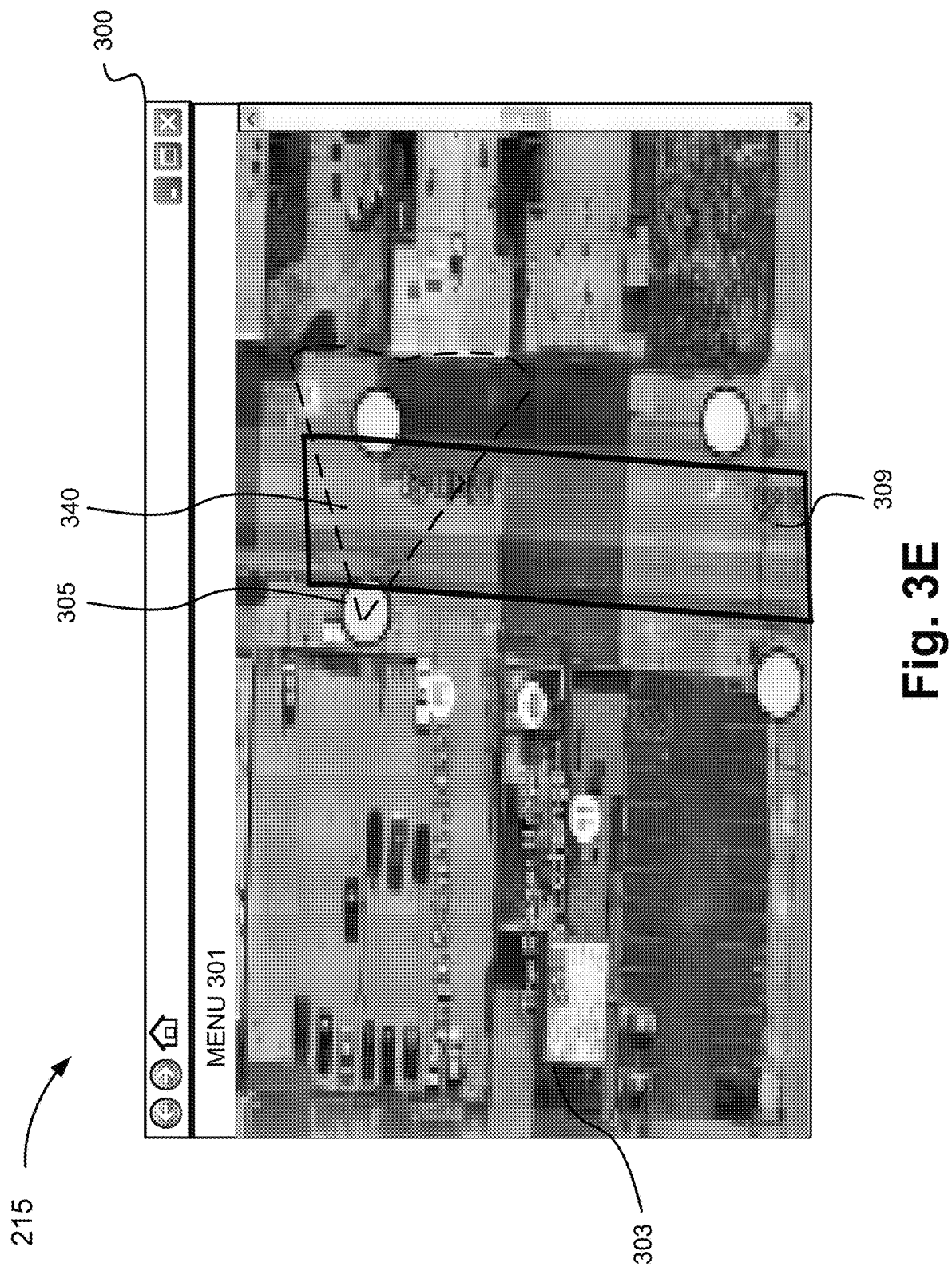

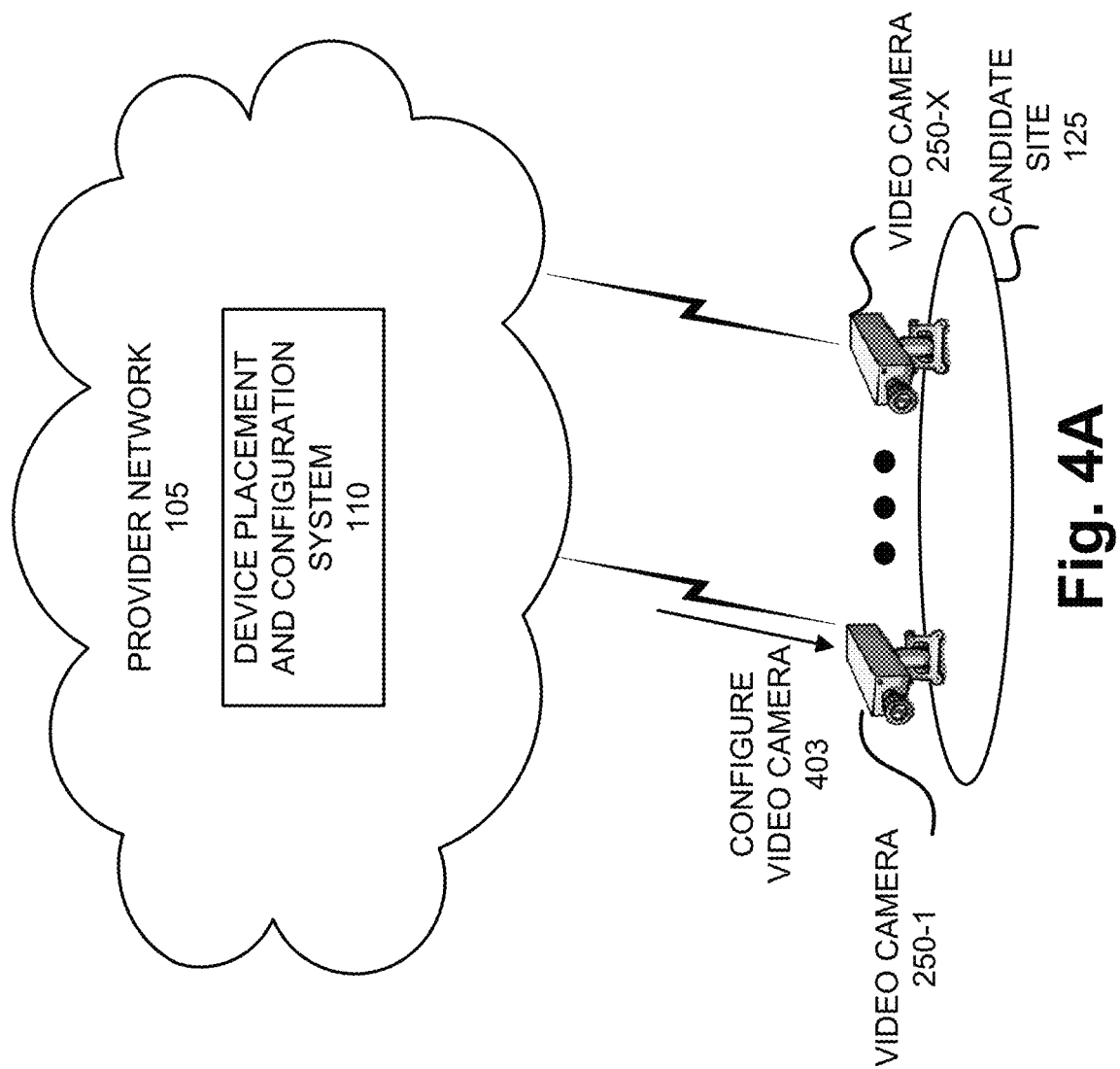

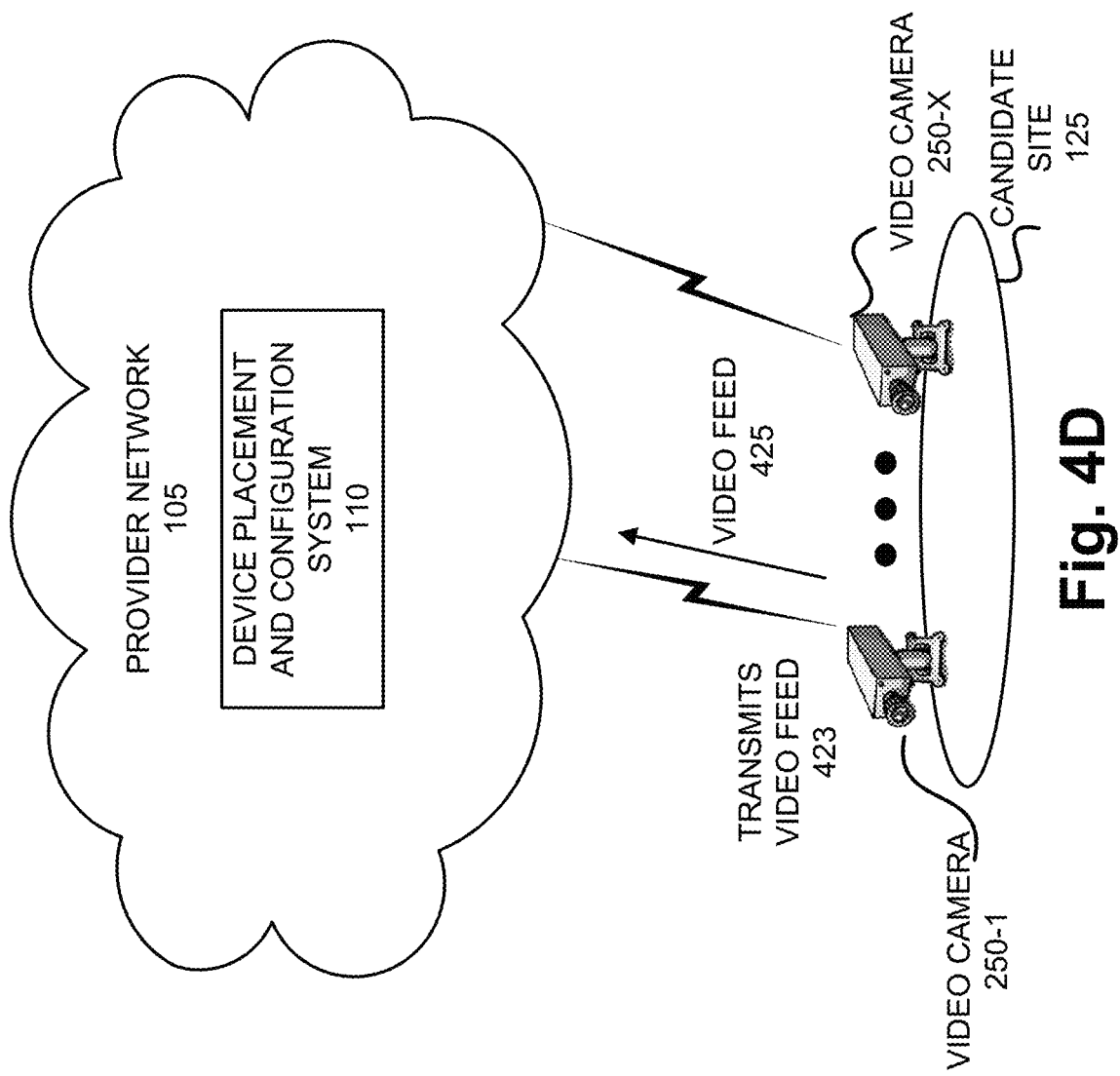

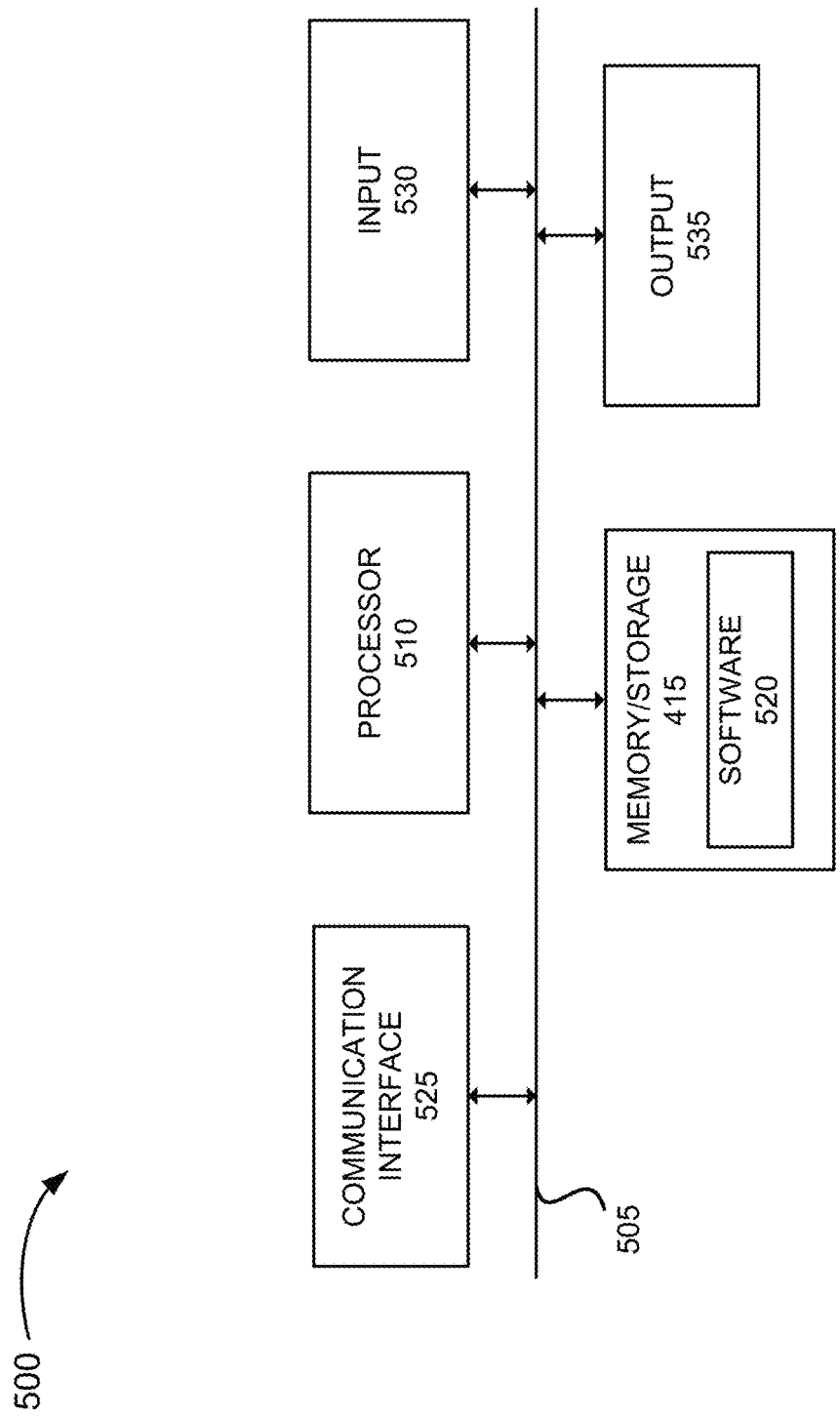

MACHINE LEARNING-BASED DEVICE PLACEMENT AND CONFIGURATION SERVICE

BACKGROUND

The deployment and use of cameras to provide various services is continuing to expand worldwide. For example, video cameras may be installed at a locale and its video feeds may be used to support a traffic-related service, a weather-related service, a parking-related service, a security-related service, an enterprise-related service, or another type of service.

BRIEF DESCRIPTION OF THE DRAWINGS

FIG. 1 is a diagram illustrating an exemplary environment in which an exemplary embodiment of a machine learning-based device placement and configuration service may be implemented;

FIGS. 3A-3G are diagrams illustrating an exemplary process of an exemplary embodiment of the machine learning-based device placement and configuration service;

FIGS. 4A-4F are diagrams illustrating another exemplary process of an exemplary embodiment of the machine learning-based device placement and configuration service;

FIG. 5 is a diagram illustrating exemplary components of a device that may correspond to one or more of the devices illustrated and described herein;

DETAILED DESCRIPTION OF PREFERRED EMBODIMENTS

Figure 2A:
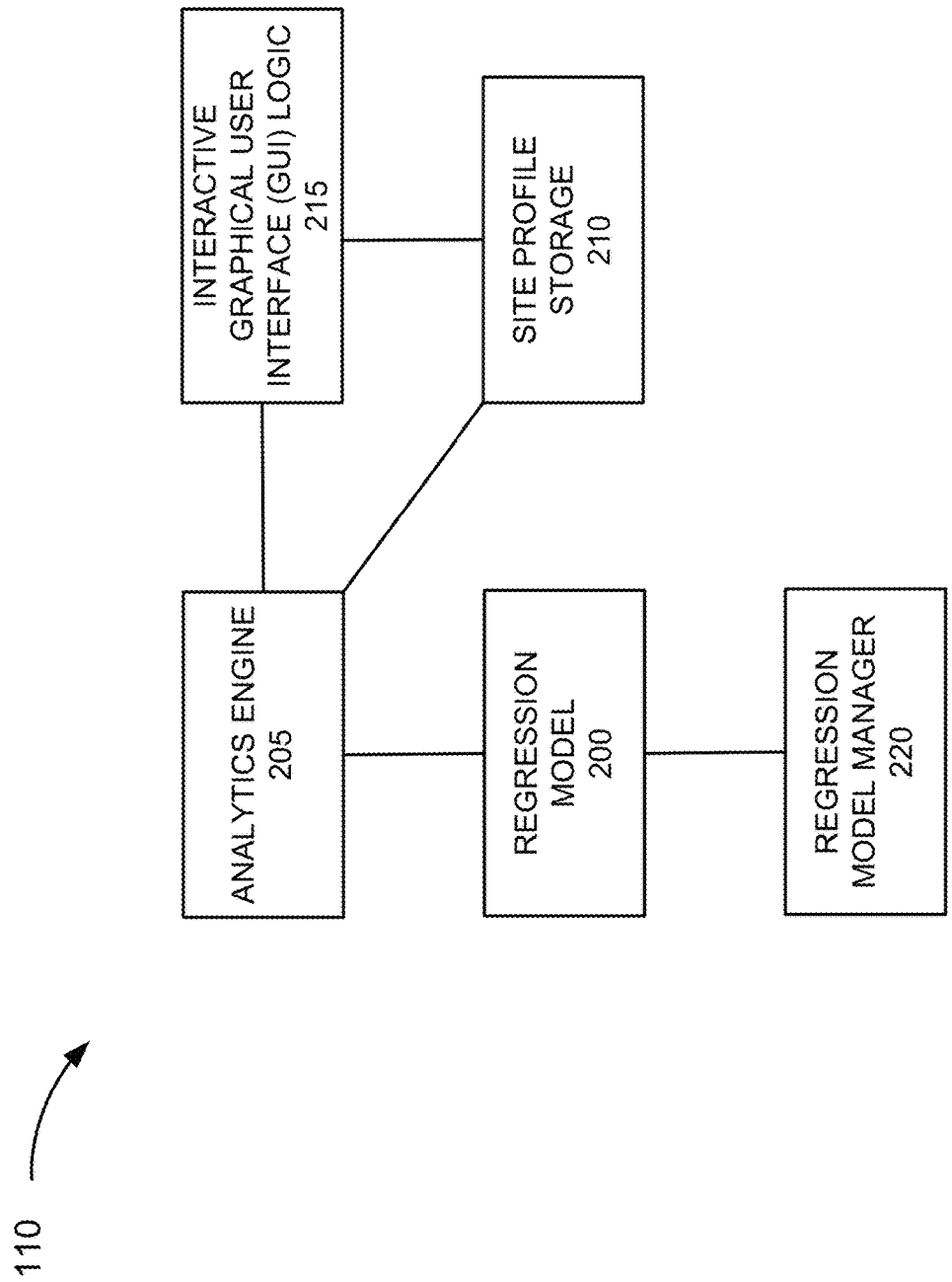
FIGS. 2A and 2B are diagrams illustrating exemplary components of a device placement and configuration system.

The following detailed description refers to the accompanying drawings. The same reference numbers in different drawings may identify the same or similar elements. Also, the following detailed description does not limit the invention.

The pre-planning, installation, testing, and use of devices can present various challenges to a provider. For example, the location and orientation of a video camera can significantly impact the performance of the video camera to capture information of an area or object of interest. Additionally, the number of video cameras to use to ensure a level of coverage of the area or object of interest becomes problematic. During the pre-planning stage, an area within which a service is to be provided is selected, and configurations pertaining to the area are determined, such as where to place each video camera and the number of video cameras to use. During the installation stage, the video cameras are installed on an asset (e.g., a pole, a building, etc.) according to the configurations decided during the pre-planning stage.

Subsequent to installation, the provider may test the installed video cameras to ascertain the field of view for each video camera and the overall coverage of the service area. During the testing stage, the provider may determine that the service is inadequate. As a result, the provider may need to return to the installation stage to adjust the placement of the video cameras and/or the number of video cameras.

Unfortunately, the process to deploy video cameras can result in inefficient use of both human and machine resources because there is no system for the provider to use to accurately predict the information to be captured by the video cameras before the video cameras are actually installed in the service area. For example, various parameters pertaining to the video camera, such as height, heading (also known as "yaw), pitch, and/or roll, as well as the type of video camera (e.g., specification/capability of the video camera) may not be addressed and/or over-generalized during the pre-planning stage. As a consequence, during the testing stage, the performance outcome may yield undesirable results.

Furthermore, even after the video cameras are successfully installed and tested, there are other deficiencies that exist. For example, the video camera parameters, such as height, heading, pitch, roll, and type of video camera that pertain to each successfully installed and tested video camera may be unknown. As a result, since the geo-location of the video camera is not known, the granularity of position for the area or object of interest relative to the field of view of the video camera is sub-optimal. Stated differently, the area or object of interest is also not geo-located or sub-optimally located.

According to exemplary embodiments, a machine learning-based device placement and configuration service is described. According to exemplary embodiments, the machine learning-based device placement and configuration service is provided by a device placement and configuration system. According to an exemplary embodiment, the device placement and configuration system uses site profile information of prior successful installations and deployments of devices at sites as a basis to calculate various parameters included in candidate site profile information for which a service is to be provided.

According to an exemplary embodiment, the machine learning-based device placement and configuration service may be directed to the placement and configuration of a video camera or a device that includes a video camera. For example, the video camera may be a fixed-position video camera.

According to an exemplary embodiment, the device placement and configuration system calculates geo-location parameters, such as position (e.g., latitude, longitude), height, heading, pitch, and roll pertaining to video cameras to be installed and used at a candidate site based on the candidate site profile information. According to another exemplary embodiment, the device placement and configuration system calculates the geo-location parameters based on other types of information included in the candidate site profile information, such as, service level information, video camera characteristic information, and/or other types of information, as described herein.

According to other exemplary embodiments, the device placement and configuration system may not calculate the geo-location parameters. For example, a user of the device placement and configuration system may input one or multiple geo-location parameters, via an interactive graphical user interface (GUI), as described herein.

According to an exemplary embodiment, the device placement and configuration system includes a regression model and an analytics engine. The analytics engine includes logic that calculates an anticipated accuracy of detection value for an area and/or an object of interest (also referred to as a "service area") based on the regression model and candidate site profile information or a portion thereof, as described herein. According to an exemplary implementation, the anticipated accuracy of detection may be indicated as a numerical value. As an example, the anticipated accuracy of detection for a parking lot may be a numerical value that indicates the amount of coverage of the parking lot, by the video cameras, as well as other sub-factors related to such coverage (e.g., characteristics of vantages points relative to the service area (e.g., height, number, etc.), number and amount of overlaps of coverage, etc.). The device placement and configuration system may output the anticipated accuracy of detection value via the interactive GUI. In this way, a user of the device placement and configuration system may be provided with an approximation of an anticipated accuracy of detection for the service area before installation.

Depending on the anticipated accuracy of detection value, the user may be dissatisfied with the anticipated accuracy of detection value. For example, a desired level of service at the candidate site may require a higher anticipated accuracy of detection value. The user may adjust the positions of video cameras within the candidate site, add or subtract the number of video cameras, adjust other geo-location parameters, via the interactive GUI, and request that the device placement and configuration system re-calculate the anticipated accuracy of detection value. According to other exemplary scenarios, the device placement and configuration system may be provided with a target anticipated accuracy of detection value. The device placement and configuration system may provide a recommendation to the user regarding the number, the position, orientation, and the camera values for the geo-located parameters pertaining to the video cameras. According to an exemplary embodiment, the device placement and configuration system may store the candidate site profile information in response to the approval of the user that the configuration meets a desired performance outcome for the service to be provided at the candidate site.

According to an exemplary embodiment, subsequent to the installation of video cameras at the candidate site in accordance with the approved candidate site profile information, the video cameras may obtain their geo-located parameters. According to an exemplary embodiment, the video cameras may generate geo-located metadata that describe an object or an area in its field of view.

According to an exemplary embodiment, the device placement and configuration system may obtain video feeds from the installed video cameras. The device placement and configuration system may use the accuracy levels of the annotated video feeds. For example, the device placement and configuration system may calculate an accuracy of detection value based on the video feeds and human annotation as a reference for the video feeds, and compare the anticipated accuracy of detection value, which was calculated during the pre-planning stage, with the post-install accuracy of detection value. The device placement and configuration system may add the site profile information to the regression model. In this way, the performance of the regression model/analysis may be improved based on this added information.

As a result of the foregoing, the device placement and configuration system may improve the utilization of resources (e.g., human, machine) to plan, test, install, and deploy devices at a candidate site. Additionally, the device placement and configuration system provides an improved user interface to facilitate the planning, testing, installing, and deployment of these devices, as described herein.

FIG. 1 is a diagram illustrating an exemplary environment 100 in which an exemplary embodiment of the machine learning-based device placement and configuration service may be implemented. As illustrated, environment 100 includes a provider network 105 that includes a device placement and configuration system 110. Environment 100 further includes a candidate site 125, an end device 150, and a user 155.

Provider network 105 may include one or multiple networks of one or multiple types. For example, provider network 105 may include a wireless network and/or a wired network. By way of further example, provider network 105 may include a radio access network (RAN), a core network, the Internet, a private network, a public network, a wide area network (WAN), a metropolitan area network (MAN), a cloud network, a virtualized network, and/or another type of network that provides access to device placement and configuration system 110.

Device placement and configuration system 110 includes a network device that provides a machine learning-based device placement and configuration service, as described herein. Device placement and configuration system 110 is described further below.

Candidate site 125 is a geographic area to which a service is to be provided based on the use of video cameras. For example, candidate site 125 may be a parking lot, a city, a building, a public area, a private area, or another type of service area. In this regard, according to various exemplary embodiments, candidate site 125 may include different characteristics (e.g., size, objects of interest, etc.). Additionally, the service to be provided based on the use of video cameras may vary, examples of which may include a traffic-related service, a weather-related service, a parking-related service, a security-related service, an enterprise-related service, or another type of service.

End device 150 includes a device that can access and use the machine learning-based device placement and configuration service. For example, end device 150 may be implemented as a computer (e.g., a desktop computer, a laptop computer, a tablet, etc.) or another type of end user device that has computational and communicative capabilities. End device 150 may include software to access and use device placement and configuration system 110. For example, end device 150 may include a web browser, a mobile application, or another type of client or agent. User 155 is a person that operates end device 150.

FIG. 2A is a diagram of exemplary components of device placement and configuration system 110. As illustrated, device placement and configuration system 110 may include a regression model 200, an analytics engine 205, site profile storage 210, interactive GUI logic 215, and a regression model manager 220.

Regression model 200 includes a regression model. According to an exemplary embodiment, the regression model includes data associated with independent variables and a dependent variable (also known as "model parameters") derived from previously installed, tested, and deployed video cameras at sites. According to an exemplary implementation, the independent variables may include one or multiple of the geo-location parameters, such as position (e.g., latitude, longitude), height, heading, pitch, and roll pertaining to the video cameras. Additionally, or alternatively, the independent variables may include parameters pertaining to object detection, as described herein, and/or a parameters pertaining to an operational characteristic and/or specification of the video camera, as described herein. According to an exemplary implementation, the dependent variable may indicate an accuracy of detection of a service area within which a service is provided at the site. The regression model may predict other type of accuracy values. For example, the regression model may predict the localization accuracy, or accuracy for a single event (e.g., accuracy for blocking the box event).

According an exemplary implementation, regression model 200 may be initially populated with the data based on experimental testing (e.g., in a lab, test sites, etc.). Additionally, regression model 200 may be updated with data associated with successfully installed, tested, and deployed video cameras of candidate sites.

Analytics engine 205 includes logic that calculates an anticipated accuracy of detection of a service area value based on regression model 200 and relevant variables of the candidate site information. For example, the relevant variables of the candidate site information may include one or multiple of the geo-location parameters of the video camera at the candidate site, an object detection variable, and/or a video camera characteristic parameter.

According to an exemplary implementation, analytics engine 205 includes logic that calculates the anticipated accuracy of detection of the service area value based on a function pertaining to object detection and use of regression model 200. For example, the function may include use of the following exemplary expressions:

$$\text{Input parameters} = [v,p,o] = f(c,s,e), \text{ where}$$

c=camera parameters (e.g., location, orientation, sensor parameters, lens parameters, etc.)
s=service area
e=environmental objects (e.g., trees, houses, poles, etc.)
$f(\ )$=function that calculates the input parameters for each object in the service area
v=visible part of the object from the camera's perspective
p=the relative position of the object compared to the camera
o=the object orientation relative to the camera $$Y = r(X, \beta) \text{ where}$$

Y=anticipated/predicted metric (e.g., anticipated accuracy of detection)
$r(\ )$=regression model
x=input vector
$\beta$=parameters of the regression model $$\text{Object Detection probability} = f(\text{Input Parameters}, r, \beta)$$
$$= r(\text{Input Parameters}, \beta)$$

$\beta$=parameters of the regression model
[r, $\beta$]—with regression analysis, the regression model and the model parameters are defined According to other exemplary implementations, analytics engine 205 includes logic that calculates the anticipated accuracy of detection of the service area value based on other known techniques, expressions, and/or methods.

As previously described, according to some exemplary embodiments, device placement and configuration system 110 may recommend geo-location parameter values to the user regarding placement or placement and number of video cameras at a candidate site. For example, the geo-location parameter values may be optimized so as to yield a desired performance outcome for the service to be provided at the candidate site. According to an exemplary implementation, analytics engine 205 may calculate values for the independent variables based on regression model 200 and the candidate site information.

According to an exemplary implementation, analytics engine 205 includes logic that calculates the geo-location parameter values based on a function that uses regression model 200. For example, the function may include use of the following exemplary expression:

$$\text{Location recommendations} = f(sl, al, s, e, r, \beta) \text{ where}$$

Location recommendation=position and orientation of cameras, camera number
sl=service level
al=asset location(s) and height(s) (e.g., pole, etc., to affix camera(s))
s=service area
e=environmental objects (e.g., trees, houses, poles, etc.)
r=regression model
$\beta$=parameters of the regression model According to another exemplary implementation, the function may include the use of the following exemplary expression:

$$\text{Location recommendations} = f(al, s, e, r, \beta, n) \text{ where}$$

Location recommendation=position and orientation of cameras, service level
al=asset location(s) and height(s) (e.g., pole, etc., to affix camera(s))
s=service area
e=environmental objects (e.g., trees, houses, poles, etc.)
r=regression model
$\beta$=parameters of the regression model
n=number of cameras According to other exemplary implementations, analytics engine 205 includes logic that calculates location recommendations based on other known techniques, expressions, and/or methods.

Site profile storage 210 includes a data repository that stores various types of information that allows device placement and configuration system 110 to provide the machine learning-based device placement and configuration service, as described herein. According to an exemplary embodiment, site profile storage 210 stores candidate site information pertaining to a candidate site for which a service is to be provided based on video cameras.

According to an exemplary implementation, the candidate site information includes map information of the candidate site. For example, the map information may include a three-dimensional representation of the candidate site. By way of further example, the map information may include satellite imagery, an automated generation of a 3D model, and/or other types of immersive image representations of the candidate site. The map information may also include metadata that identifies various objects or regions within the map information. For example, the map information may indicate a street name, the name of a building, or another type of identifier pertaining to an object or space within an image. Additionally, for example, the candidate site information may indicate the position (e.g., latitude, longitude, height) of certain assets at the candidate site, such as a pole or other object/structure that may be used to affix a video camera.

According to an exemplary implementation, the candidate site information may include service information. For example, the service information may indicate a service to be provided at the candidate site (e.g., parking occupancy, traffic detection, etc.) and other parameters, such as a maximum number of video cameras to use, the type of video cameras to use, a target anticipated accuracy of detection value, and other directives that may pertain to the pre-planning, installing, testing, and/or deployment stages.

According to an exemplary implementation, the candidate site information includes video camera characteristic information. For example, the video camera characteristic information may include various parameters and parameter values pertaining to the operational characteristics and/or specification of the video camera. For example, the video camera characteristic information may indicate applicable environment (e.g., indoor, outdoor, both, etc.), resolution (e.g., pixels, frames per second, etc.), optical characteristics of lens, iris control, degree of view (e.g., 180 degrees, etc.), illumination capability, light sensitivity, dynamic range, mounting style, and so forth.

According to an exemplary implementation, the candidate site information may also store information associated with analytics engine 205 (e.g., calculations, etc.), interactive GUI logic 215 (e.g., user inputs, etc.), video feed data from installed video cameras, test result data pertaining to tests for installed video cameras, and other information that may be obtained or generated as a result of providing the machine learning-based device placement and configuration service.

Interactive GUI logic 215 includes logic that provides an interactive graphical user interface for a user to use the machine learning-based device placement and configuration service provided by device placement and configuration system 110, as described herein. According to various exemplary embodiments, the interactive GUI may include various types of interactive elements (e.g., menus, pop-up windows, input fields, buttons, etc) that provide an interactive environment within which the user may use device placement and configuration system 110. The interactive GUI may also include tools that allow the user to perform various tasks, such as select a location to place a video camera on map information; navigate through the map information in an immersive way; draw or define an area within the map information; designate a service area or sub-area of the service area; etc. Additionally, according to various exemplary embodiments, the interactive GUI may include one or multiple regions that may display independent or interdependent information, real-time information (e.g., video feeds of installed video cameras), etc.

Figure 3A:
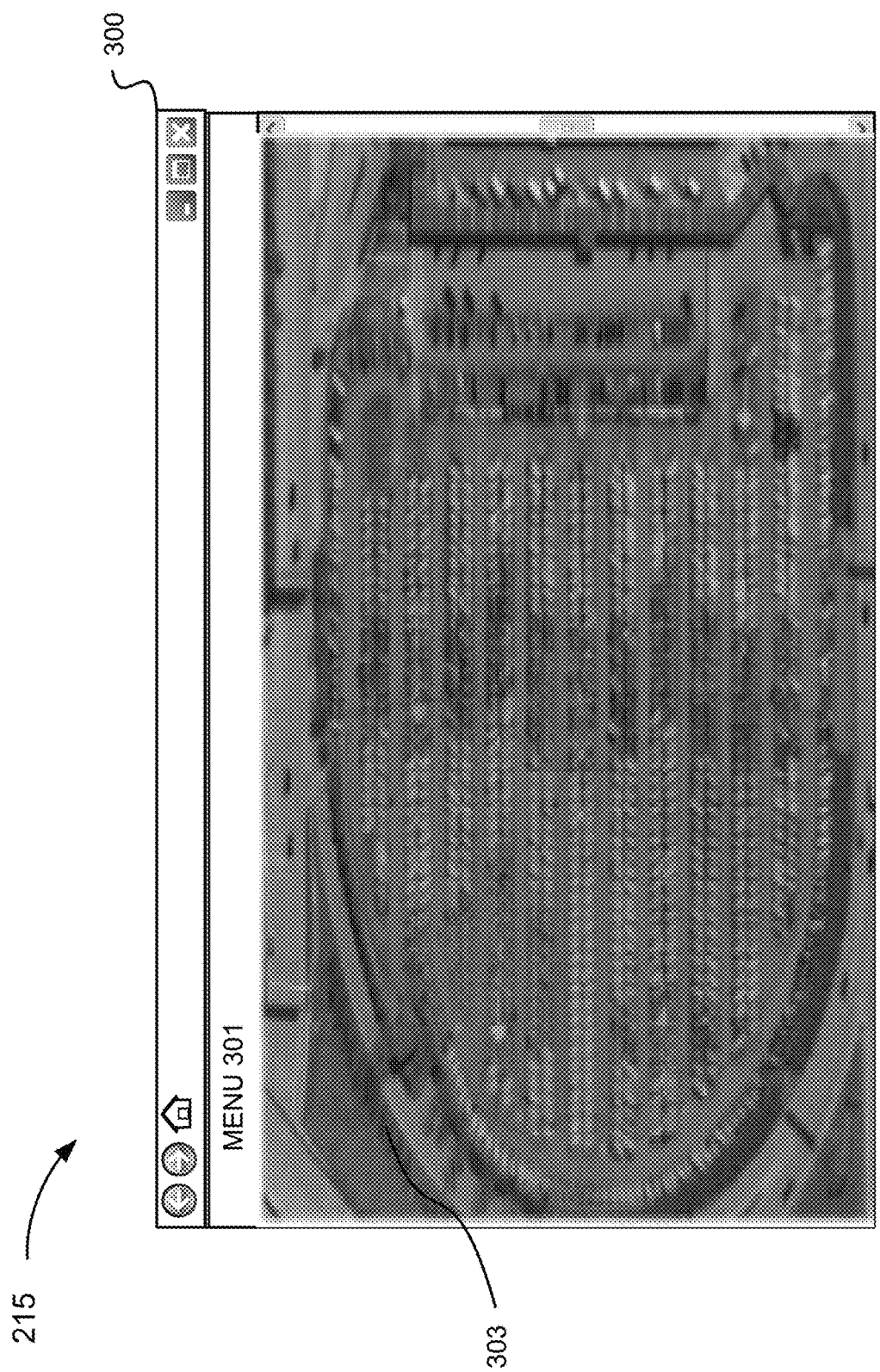

According to an exemplary embodiment, interactive graphical user interface logic 215 provides an interactive GUI that allows the user to display the map information of the candidate site. For example, referring to FIG. 3A, an interactive GUI 300 may include a menu 301 that provides interactive functionality. Interactive GUI 300 may display map information 303 of a candidate site.

Figure 3B:
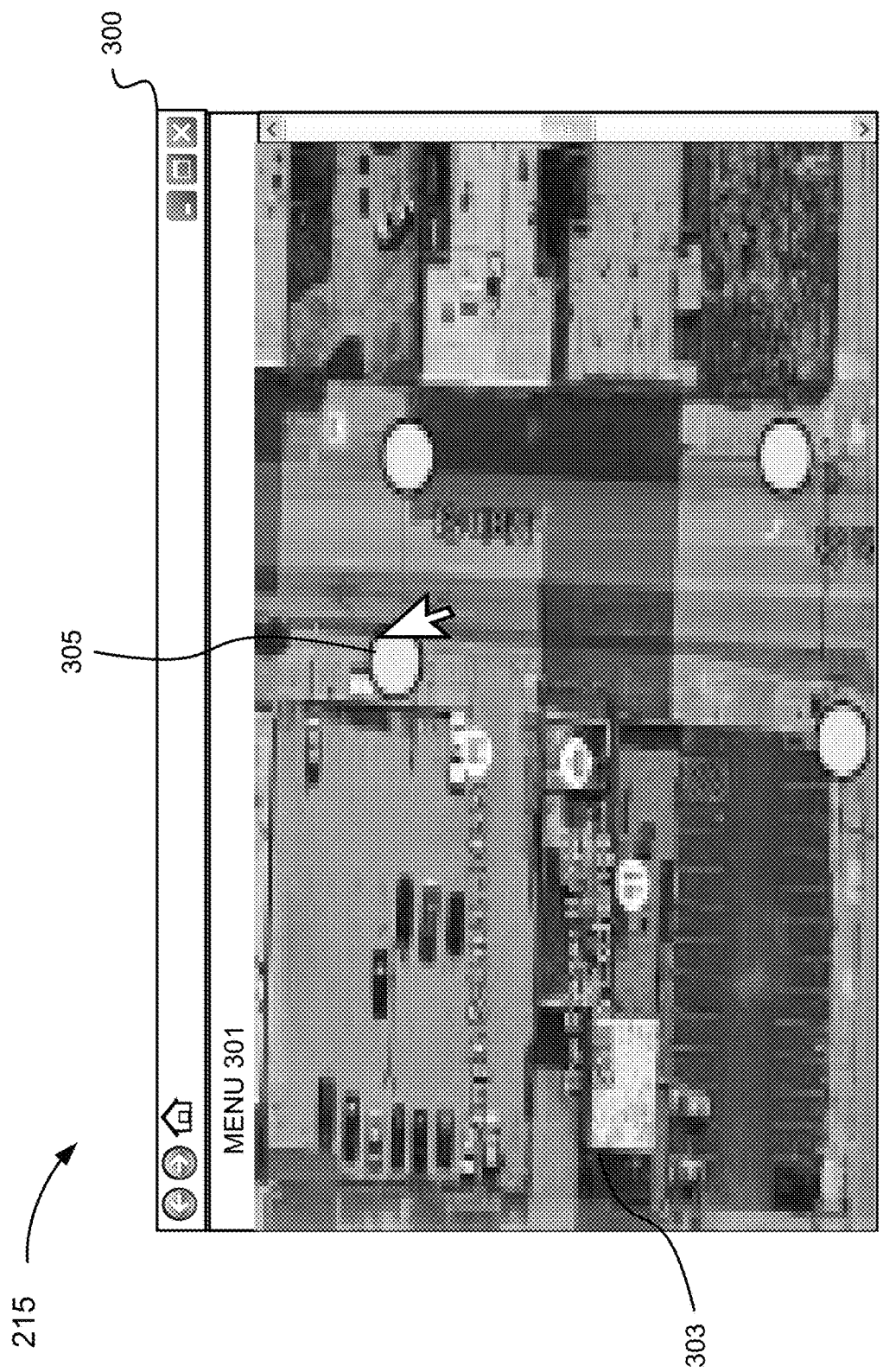
Figure 3C:
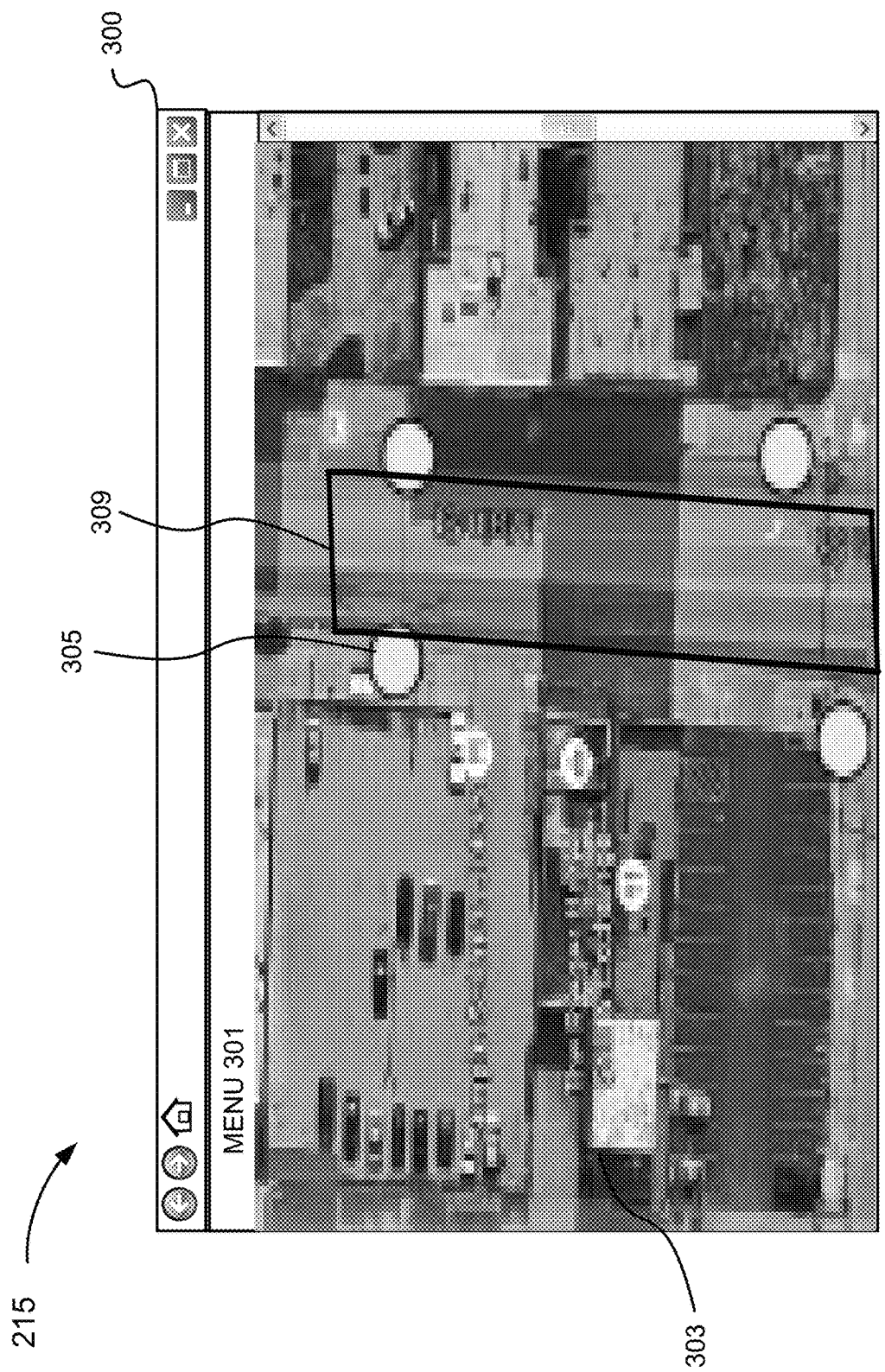
Figure 3D:
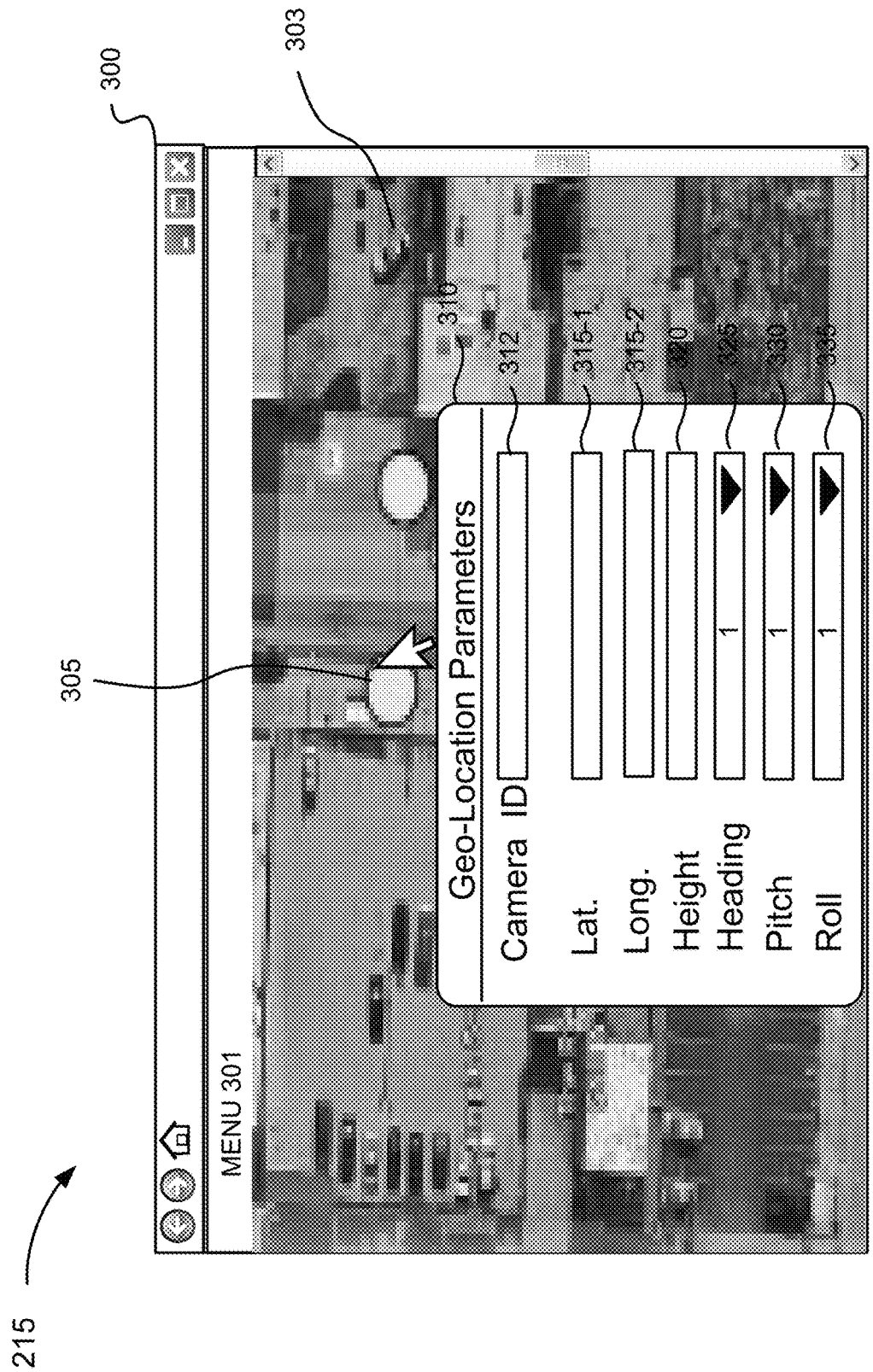

According to an exemplary embodiment, the interactive GUI may allow the user to select a position of a video camera. For example, referring to FIG. 3B, interactive GUI 300 may allow the user to select an asset 305 (e.g., a pole) on which a video camera is to be placed. Also, for example, the interactive GUI may allow the user to define the service area within the map information. For example, referring to FIG. 3C, the user may select or indicate the service area or a portion thereof 309. According to an exemplary embodiment, the interactive GUI may allow to configure geo-location parameters for the video camera. For example, referring to FIG. 3D, the user may configure geo-location parameters for the video camera via an interactive GUI 310. As illustrated, interactive GUI 310 may include a camera id 312, latitude and longitude 315-1 and 315-2, a height 320, a heading 325, a pitch 330, and a roll 335.

Figure 3F:
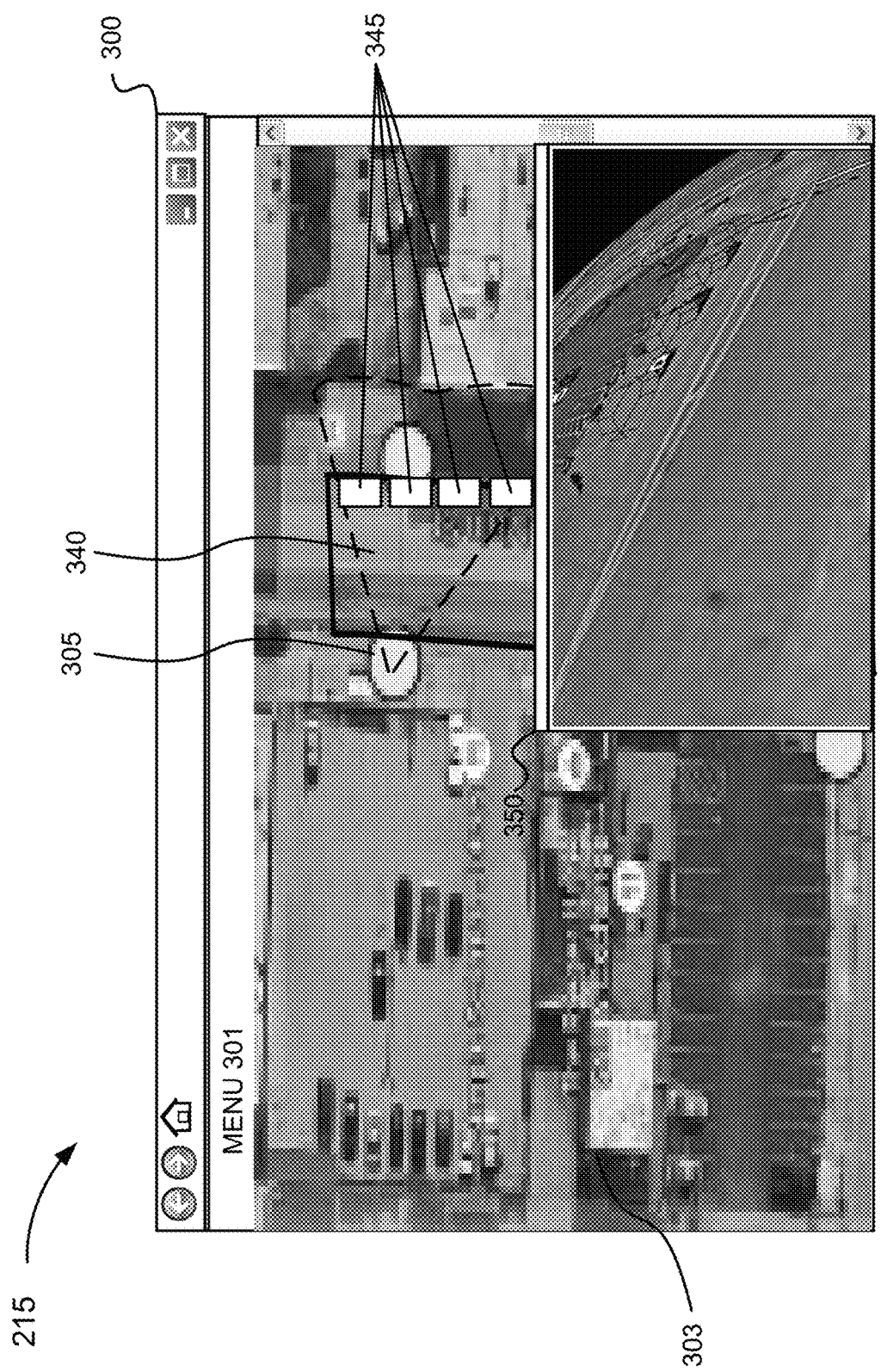

According to an exemplary embodiment, the interactive GUI may allow the user to see an estimated field of view based on geo-location parameters, the map information, and the camera parameters (e.g., location, orientation, sensor and lens parameters, etc.). For example, referring to FIG. 3E, interactive GUI 300 may indicate a field of view 340 relative to the service area or a portion thereof 309. The interactive GUI may also allow the user to see the field of view from the vantage point of the (virtual) installed video camera. For example, referring to FIG. 3F, the user may place objects of interest 345 in field of view 340. By way of further example, the objects of interest 345 may correspond to the same or different types of vehicles (e.g., car, truck, SUV, etc.) having certain physical dimensions. A GUI 350 may display the estimated virtual field of view of the objects of interest 345.

Figure 3G:
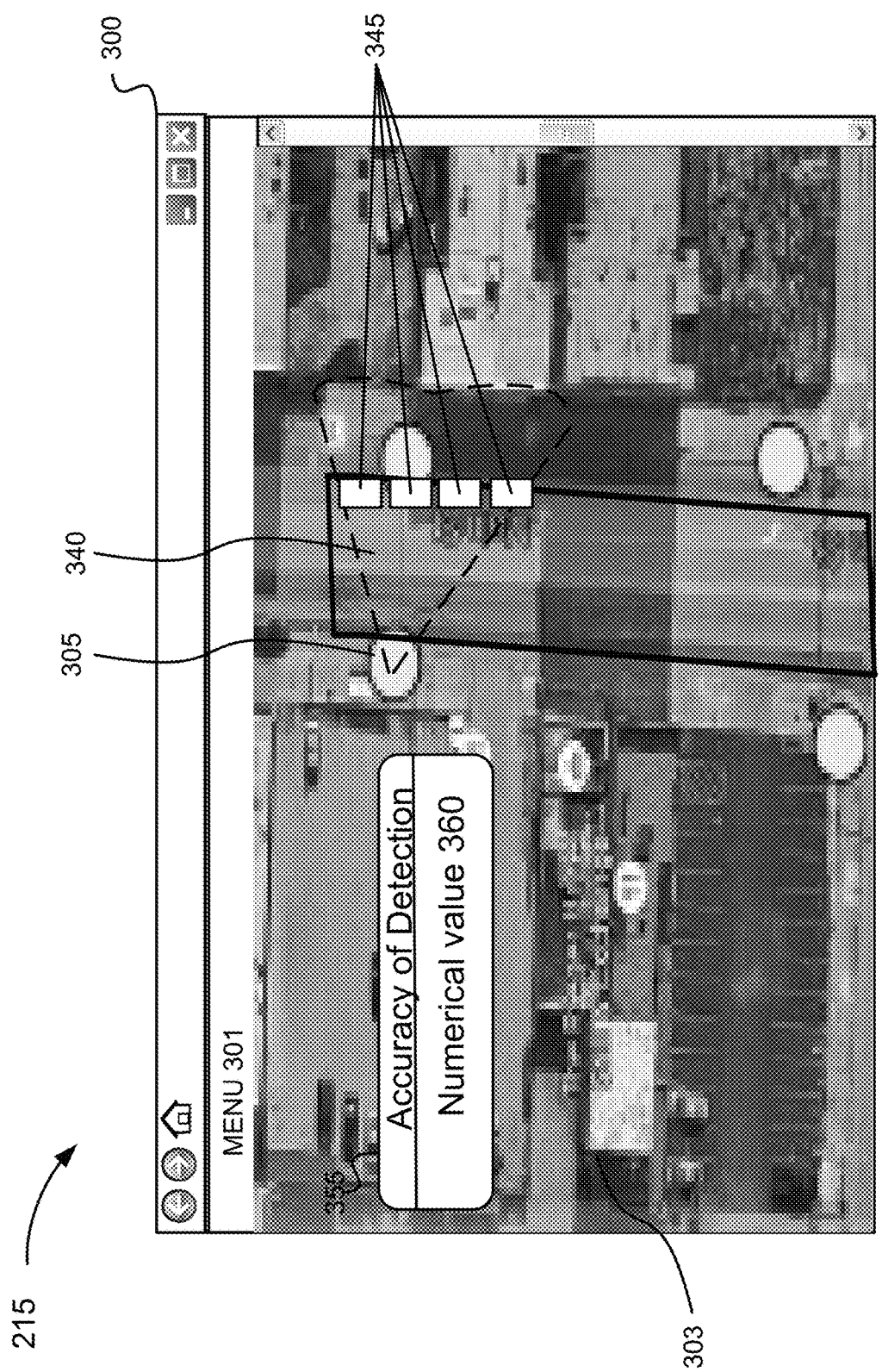

The user may request that an anticipated accuracy of detection value be calculated via the interactive GUI. The interactive GUI may display the calculated anticipated accuracy of detection value to the user, or indicate whether the anticipated accuracy of detection value satisfies a target value. For example, referring to FIG. 3G, a GUI 355 may display the anticipated accuracy of detection value (e.g., numerical value 360) to the user calculated by analytics engine 205. When the anticipated accuracy of detection value satisfies the target value, which may be determined by the user and/or device placement and configuration system 110 (e.g., based on a comparison of numerical value 360 to the target value), the user may approve the pre-planning configuration, and the installation stage may be carried out. However, when the anticipated accuracy of detection value does not satisfy the target value, the user may modify various parameters and configurations, such as the number of video cameras, the placement of the video cameras, the geo-location parameters, service area 309, etc. This process may repeat until the anticipated accuracy of detection value satisfies the target value. Alternatively, as previously described, when requested by the user, device placement and configuration system 110 may generate a recommendation pertaining to one or more of the various parameters and configurations. For example, analytics engine 205 may calculate a parameter or configuration based on candidate site information stored in site profile storage 210 and the exemplary location recommendation expressions, previously described.

Referring back to FIG. 2A, regression model manager 220 includes logic that manages regression model 200. For example, regression model manager 220 may update regression model 200 with data stemming from a successfully deployed service using installed and tested video cameras. In this way, the knowledge base of regression model 200 may increase and may improve the anticipated accuracy of detection of a service area calculated before installation. For example, the new data may increase the precision of the anticipated accuracy.

Figure 2B:
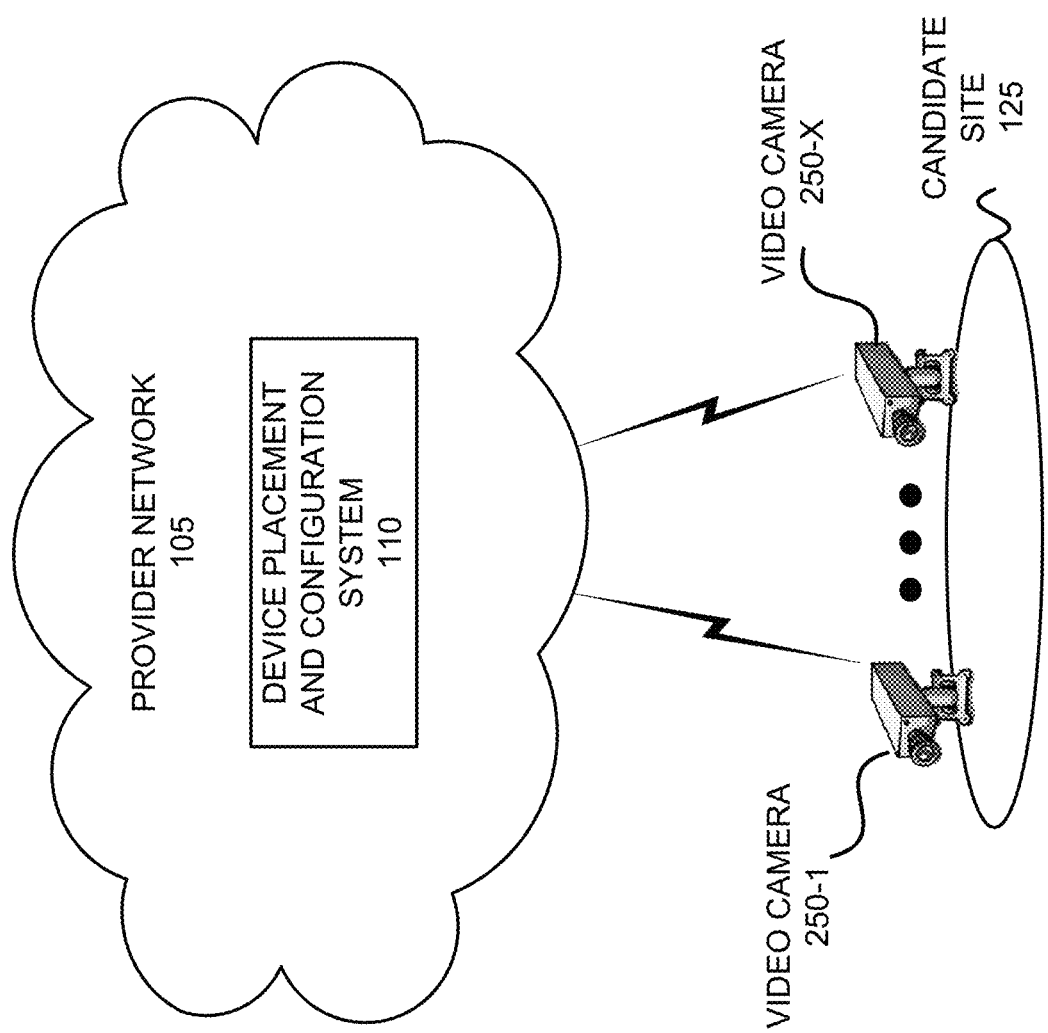

Subsequent to the pre-planning stage, video cameras may be installed at candidate site 125 according to the pre-planning configurations, as a part of the installation stage. As a result of the installation stage, installed video cameras may be communicatively coupled to device placement and configuration system 110. For example, referring to FIG. 2B, installed video cameras 250-1 through 250-X (also referred to collectively as video cameras 250 and individually or generally as video camera 250) may be configured to communicate to device placement and configuration system 110 via provider network 105 and vice versa.

Figure 4B:
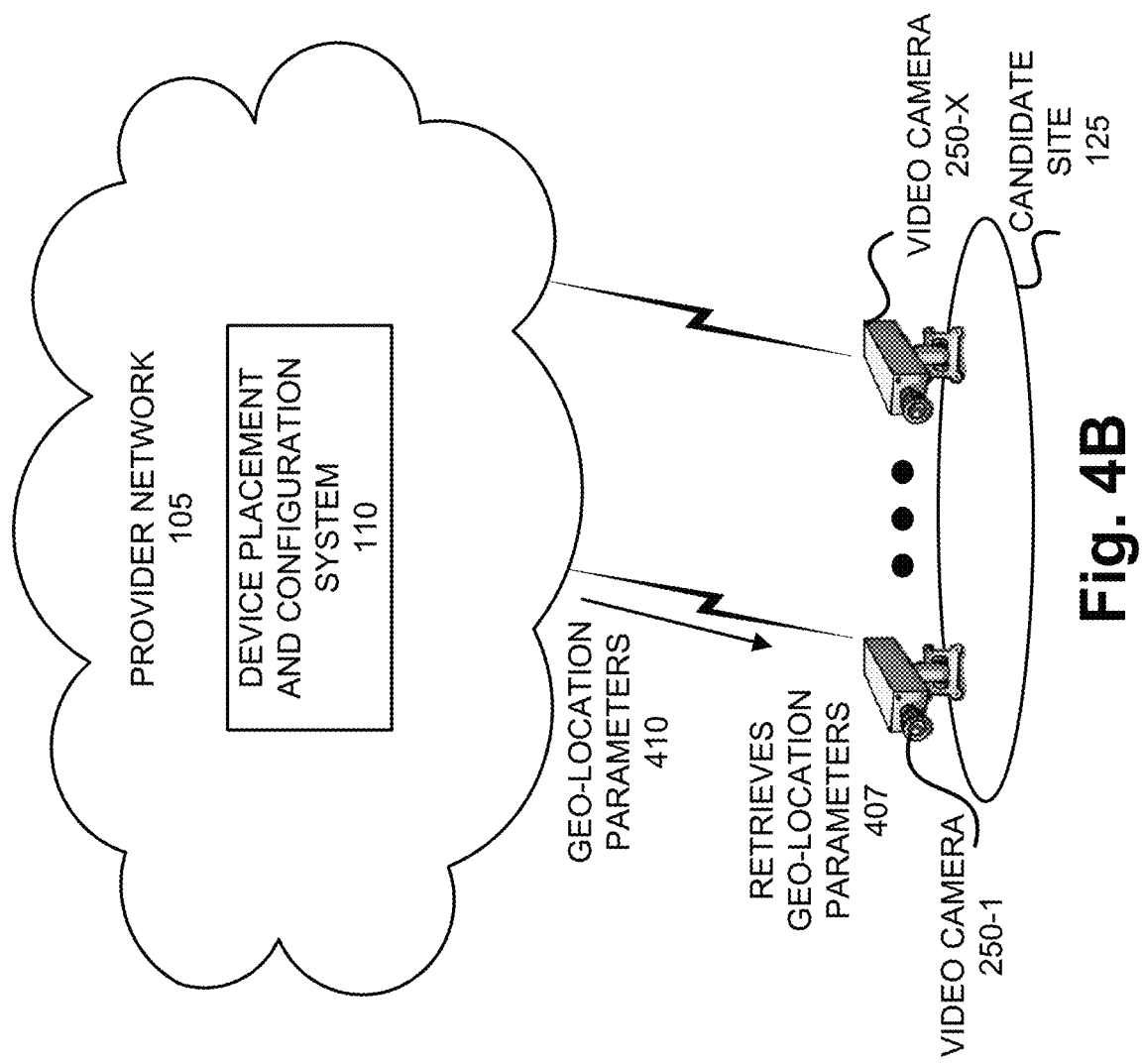

FIGS. 4A-4F are diagrams illustrating another exemplary process of an exemplary embodiment of the machine learning-based device placement and configuration service. Referring to FIG. 4A, subsequent to installation of video camera 250, video camera 250 is configured 403. Video camera 250 may be configured remotely via device placement and configuration system 110 (e.g., transmission of a message to video camera 250), or by a person (e.g., a technician, an installer, etc.) at candidate site 125. Referring to FIG. 4B, either as part of a configuration process or subsequent to the configuration process, video camera 250 may retrieve geo-location parameters 410. For example, video camera 250 may obtain geo-location parameters 410 from site profile storage 210.

Figure 4C:
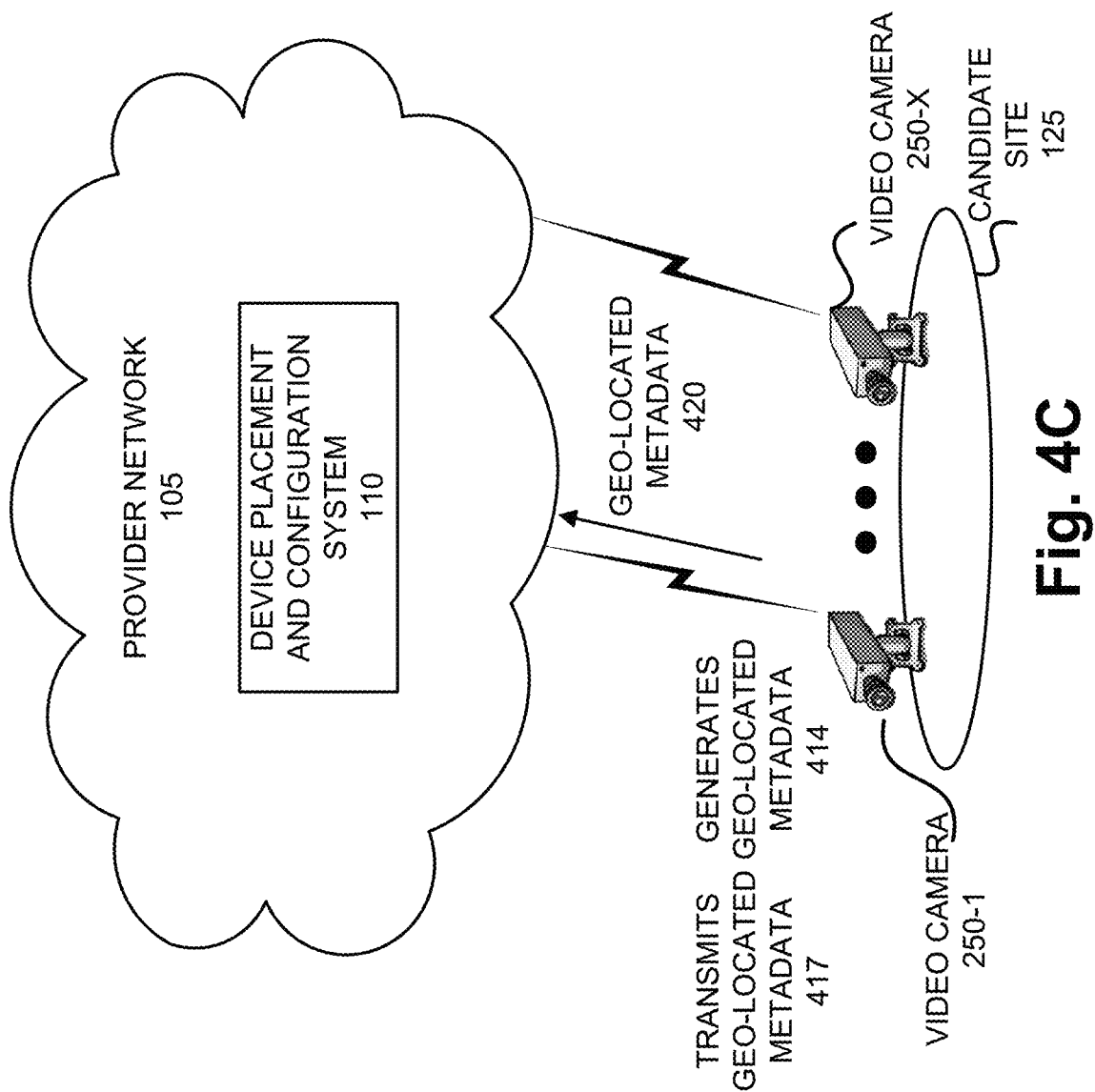

Referring to FIG. 4C, video camera 250 generates geo-located metadata 414. For example, based on the geo-location parameters pertaining to video camera 250, video camera 250 includes logic that generates geo-located metadata for a service area that is within the field of view of video camera 250. For example, for a parking occupancy service, video camera 250 may generate geo-located metadata that indicates where parking spaces, cars, light poles, etc., are located. Video camera 250 may include object recognition logic. Subsequent to the generation of the geo-located metadata, video camera 250 may transmit the geo-located metadata 417 to device placement and configuration system 110. For example, the transmitted geo-located metadata 420 is stored in site profile storage 210.

Figure 4E:
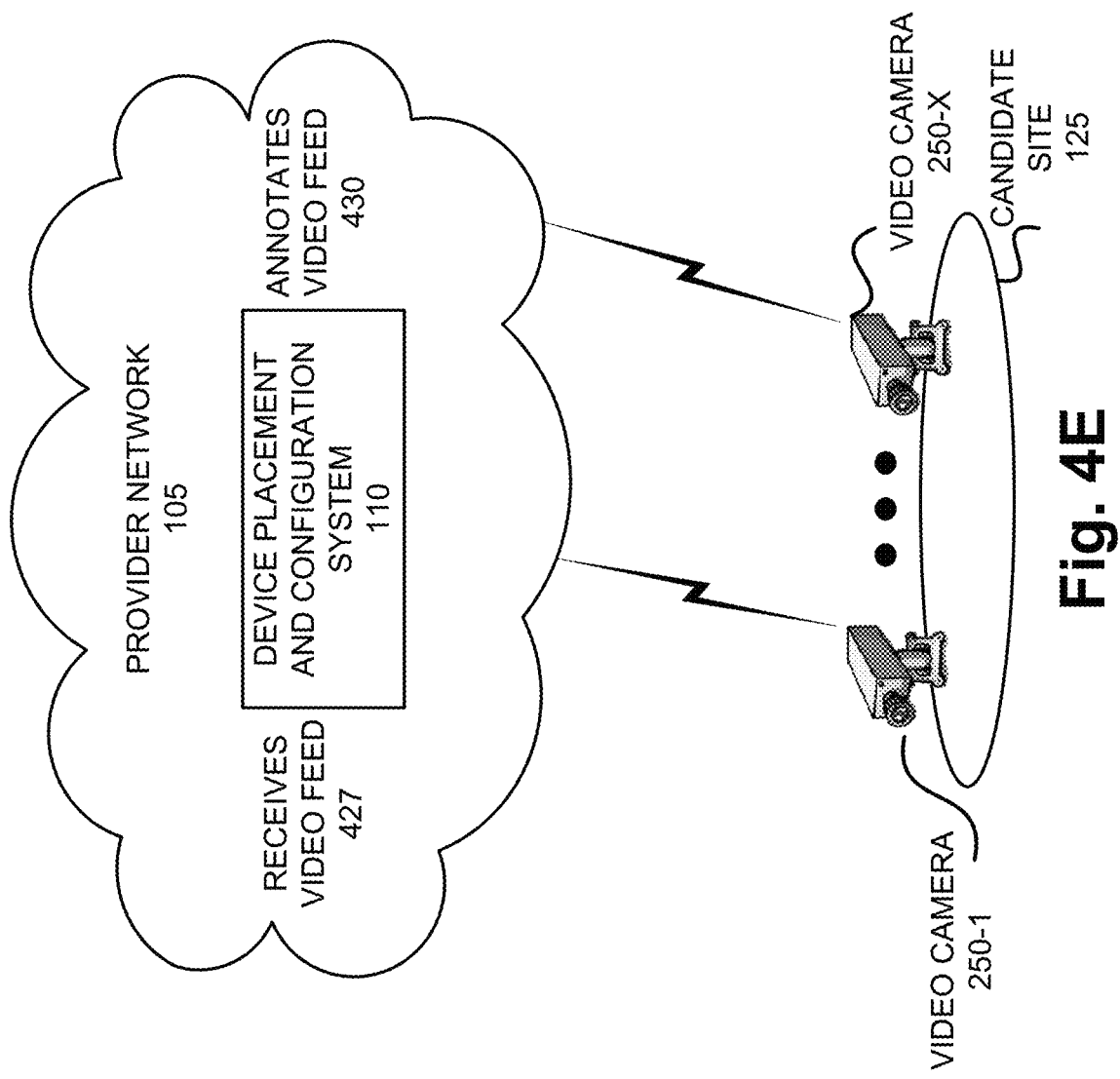
Figure 4F:
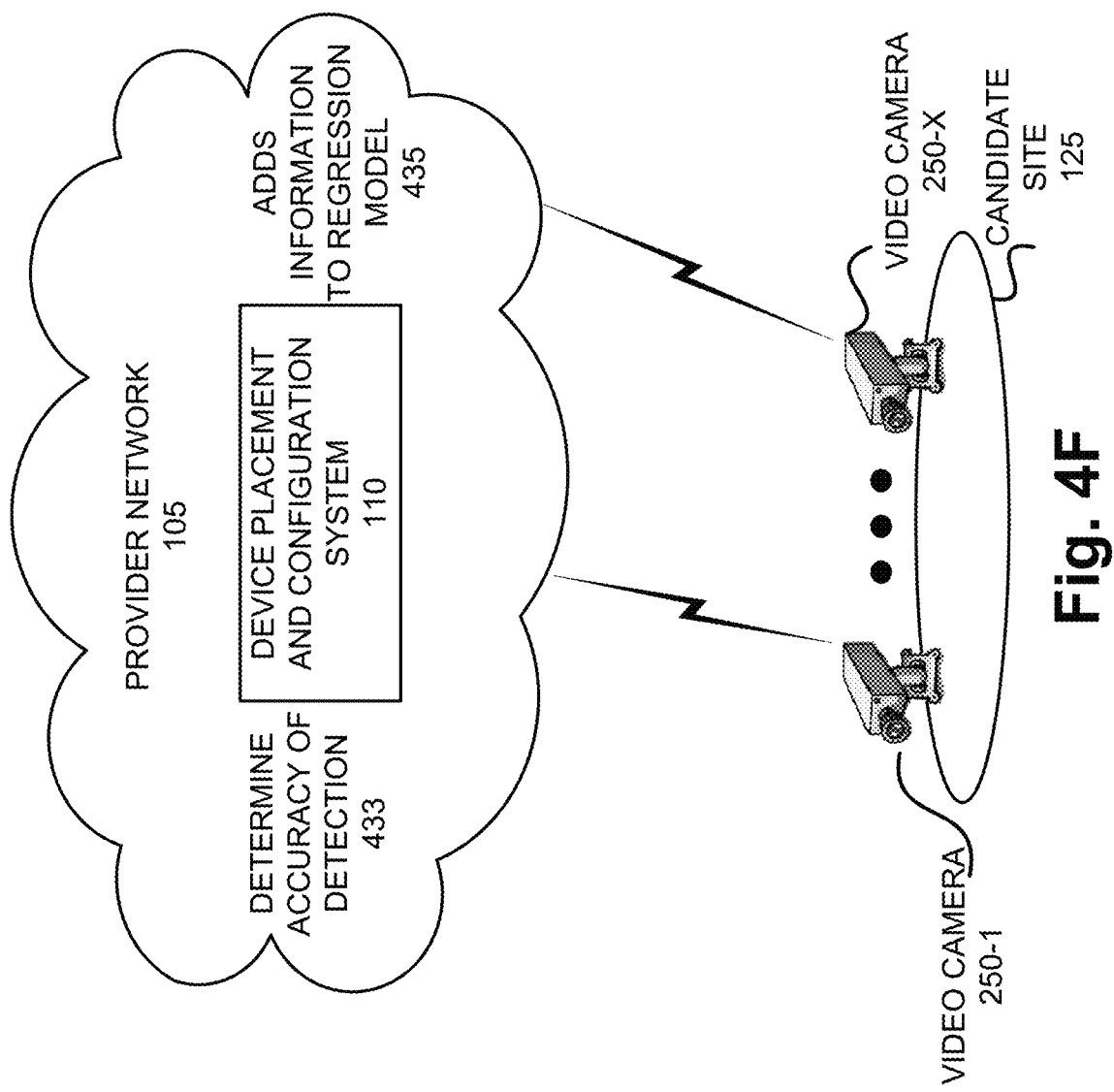

Referring to FIG. 4D, video camera 250 may transmit a video feed 423 to device placement and configuration system 110. For example, the transmitted video feed 425 is stored in locations accessible by the analytics engine 205. Referring to FIG. 4E, device placement and configuration system 110 receives the accuracy information derived from the video feed 427. In response to receiving the video feed, analytics engine 205 may annotate the video feed 430. Based on the annotation of the video feed, analytics engine 205 may determine the accuracy of detection 433. For example, analytics engine 205 may determine an accuracy of detection value relative to the service area (e.g., objects in the field of view, etc.). Analytics engine 205 may also compare the anticipated accuracy of detection value, which is calculated prior to the installation, with the accuracy of detection value, which is calculated post-installation. Regression model manager 220 may add or update the data associated with the model parameters of regression model 220 based on the calculations and analysis from analytics engine 205.

FIG. 5 is a diagram illustrating exemplary components of a device 500 that may be included in one or more of the devices described herein. For example, device 500 may correspond to components included in device placement and configuration system 110, end device 150, and video camera 250. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, graphic processing units (GPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to device placement and configuration system 110, software 520 may include an application that, when executed by processor 510, provides a function of the machine learning-based device placement and configuration service, as described herein. Additionally, with reference to end device 150 and video camera 250, software 520 may include an application that, when executed by processor 510, provides a function of the service, as described herein. Software 520 may also include firmware, middleware, microcode, hardware description language (HDL), and/or other form of instruction. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, etc.

Input 530 permits an input into device 500. For example, input 530 may include a keyboard, a mouse, a display, a touchscreen, a touchless screen, a button, a switch, an input port, speech recognition logic, a camera, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
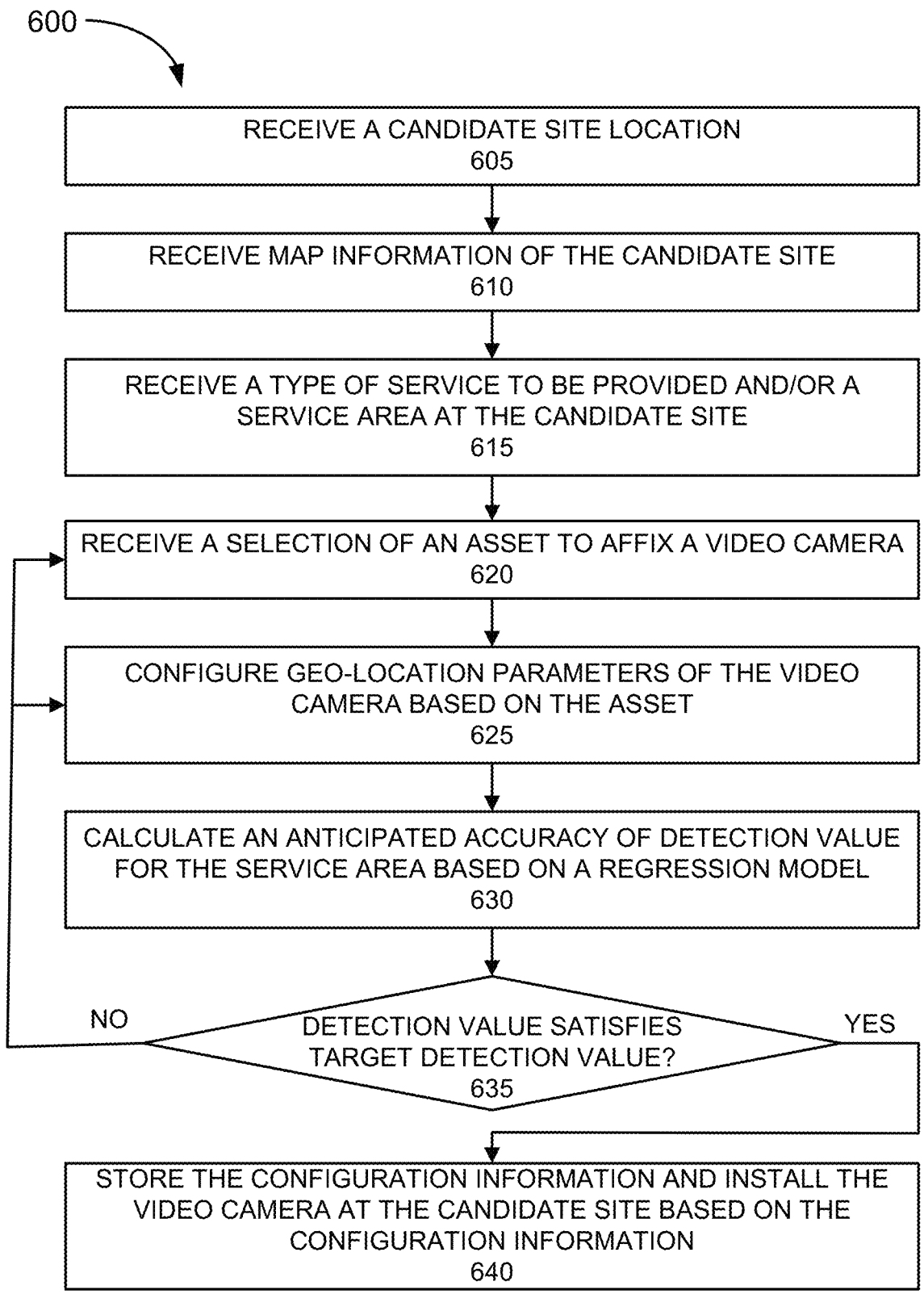
FIG. 6 is a flow diagram illustrating an exemplary process of an exemplary embodiment of the machine learning-based device placement and configuration service.

FIG. 6 is a flow diagram illustrating an exemplary process 600 of an exemplary embodiment of the machine learning-based device placement and configuration service. According to an exemplary embodiment, device placement and configuration system 110 that provides the service, as described herein, may perform steps of process 600. For example, processor 510 executes software 520 to perform the step illustrated in FIG. 6, and described herein.

Referring to FIG. 6, in block 605, a candidate site location is received. For example, as previously described, device placement and configuration system 110 may obtain geo-location coordinates (e.g., latitude, longitude) of a candidate site, a name of a place (e.g., a city, a traffic intersection, a mall, a building, etc.), an address (e.g., 1936 University Ave, Berkeley, Calif., etc.), and/or another type of information that indicates a location of the candidate site.

In block 610, map information of the candidate site is received. For example, as previously described, device placement and configuration system 110 may obtain an immersive image representation of the candidate site (e.g., satellite imagery, 3D model, 2D image, etc.). The map information may include metadata.

In block 615, a type of service to be provided and/or a service area at the candidate site is received. For example, as previously described, device placement and configuration system 110 may obtain information indicating the type of service to be provided at the candidate site (e.g., parking occupancy detection, traffic detection, weather-related, etc.).

In block 620, a selection of an asset to affix a video camera is received. For example, as previously described, device placement and configuration system 110 may obtain a selection of an asset to affix a virtual video camera (e.g., representative of an actual video camera to be installed). According to some exemplary implementations, the selection of the asset may be from a user via an interactive GUI, as previously described. According to other exemplary implementations, the selection of the asset may be based on a recommendation from device placement and configuration system 110.

In block 625, geo-location parameters for the video camera are configured. For example, as previously described, device placement and configuration system 110 may obtain geo-location parameters for the virtual video camera to be affixed to the asset at the candidate site. According to some exemplary implementations, the configuration of the geo-location parameters may be from the user via the interactive GUI, as previously described. According to other exemplary implementations, the configuration of the geo-location parameters may be based on a recommendation from device placement and configuration system 110.

In block 630, an anticipated accuracy of detection value is calculated for the service area based on a regression model. For example, as previously described, device placement and configuration system 110 may calculate the anticipated accuracy of detection value based on regression model 200, relevant variables of the candidate site information, the exemplary expressions, the map information, the field of view of the virtual video camera, and/or other types of information described herein. Device placement and configuration system 110 may calculate the field of view of the virtual video camera based on the map information, the geo-location parameters, and video camera characteristic information.

In block 635, it may be determined whether the anticipated accuracy of detection value satisfies a target accuracy of detection value. For example, device placement and configuration system 110 may compare the anticipated accuracy of detection value to the target accuracy of detection value. Based on the comparison, device placement and configuration system 110 may determine whether the accuracy of detection value is satisfied. For example, if the anticipated accuracy of detection value is equal to or greater than the target accuracy of detection value, device placement and configuration system 110 may determine that the accuracy of detection value is satisfied, and if the anticipated accuracy of detection value is less than the target accuracy of detection value, device placement and configuration system 110 may determine that the accuracy of detection value is not satisfied.

When it is determined that the anticipated accuracy of detection value is not satisfied (block 635—NO), process 600 may return to block 620 and/or block 625. For example, device placement and configuration system 110 may obtain a modification of the selection of the asset at which the virtual video camera is affixed and/or the configuration of geo-location parameters of the virtual video camera/asset.

When it is determined that the anticipated accuracy of detection value is satisfied (block 635—YES), the configuration information is stored, and the video camera at the candidate site is installed based on the configuration information (block 640). For example, as previously described, device placement and configuration system 110 may store the configuration information in site profile storage 210. Additionally, the video camera may be installed at the selected asset along with the geo-location parameters (e.g., height, pitch, roll, etc.).

Although FIG. 6 illustrates an exemplary process 600 of the service, according to other embodiments, process 600 may include additional operations, fewer operations, and/or different operations than those illustrated in FIG. 6, and described herein. For example, according to other exemplary embodiments, process 600 may exclude block 615.

Figure 7:
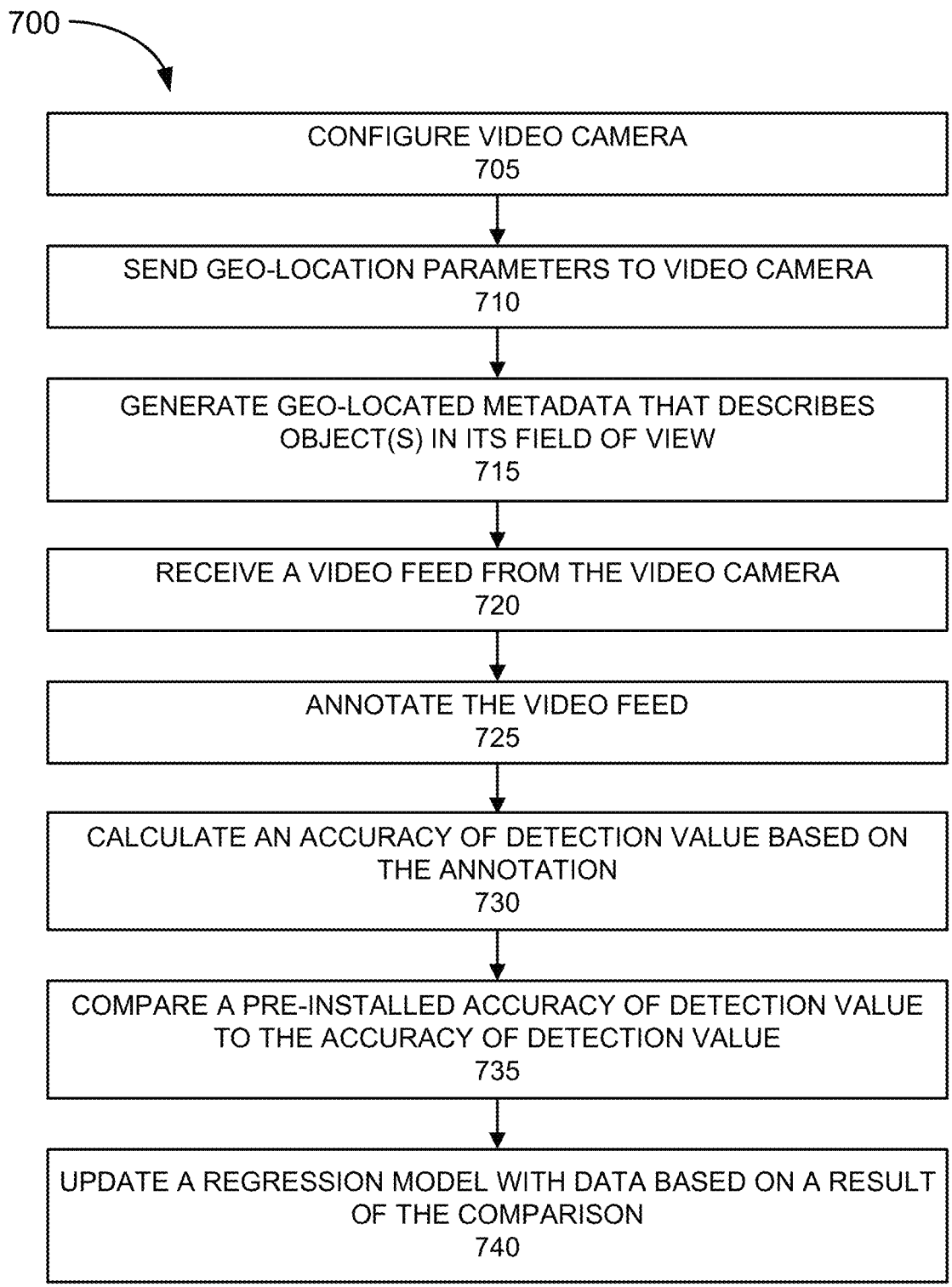
FIG. 7 is a flow diagram illustrating another exemplary process of an exemplary embodiment of the machine learning-based device placement and configuration service.

FIG. 7 is a flow diagram illustrating an exemplary process 700 of an exemplary embodiment of the machine learning-based device placement and configuration service. According to an exemplary embodiment, device placement and configuration system 110 that provides the service, as described herein, may perform steps of process 700. For example, processor 510 executes software 520 to perform the step illustrated in FIG. 7, and described herein.

Referring to FIG. 7, in block 705, a video camera is configured. For example, as previously described, as a part of the installation, video camera 250 may be configured. In block 710, geo-location parameters are provided to the video camera. For example, as previously described, device placement and configuration system 110 or video camera 250 downloads geo-location parameters of video camera 250. In block 715, geo-located metadata, which describes object(s) in its field of view, is generated. For example, as previously described, video camera 250 uses object detection/recognition that identifies an area and/or an object in its field of view based on images captured by video camera 250. Video camera 250 may determine the location of the area/object relative to video camera 250 and/or other positional information (e.g., orientation, etc.). The metadata may include this type of information (e.g., identity of object, location, position, orientation, etc.).

In block 720, a video feed from the video camera is received. For example, as previously described, device placement and configuration system 110 may obtain a video from video camera 250. In block 725, the video feed is annotated. In block 730, an accuracy of detection value is calculated based on the annotation. In block 735, a pre-installed accuracy of detection value is compared to the accuracy of detection value. In block 740, a regression model is updated based on the data associated with a result of the comparison. For example, based on detection values and annotations, the device placement and configuration system 110 may improve detailed accuracy values for the provided service areas. The regression model update may occur via back propagation of exiting detection values/annotations sets and new ones.

Although FIG. 7 illustrates an exemplary process 700 of the service, according to other embodiments, process 700 may include additional operations, fewer operations, and/or different operations than those illustrated in FIG. 7, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    storing, by a network device, a regression model that stores data associated with parameters derived from previously installed and tested video cameras at sites;
    obtaining, by a network device, location information of a candidate site at which a service is to be provided in a service area based on an installation of one or more video cameras;
    obtaining, by the network device, map information of the candidate site that includes the service area;
    displaying, by the network device via an interactive graphical user interface, the map information;
    receiving, by the network device via the interactive graphical user interface, one or more selections of one or more assets in the map information at which one or more virtual video cameras are to be virtually affixed;
    receiving, by the network device via the interactive graphical user interface, geo-location parameters for the one or more virtual video cameras to be virtually affixed, wherein the geo-location parameters include location, height, heading, pitch, and roll;
    calculating, by the network device, an anticipated accuracy of detection value for the service area or a portion of the service area based on the geo-location parameters, the regression model, the map information, and one or more fields of view for the one or more virtual video cameras;
    determining, by the network device subsequent to the calculating, whether the anticipated accuracy of detection value satisfies a target accuracy of detection value for the candidate site; and
    using the geo-location parameters to install and test the one or more video cameras at the candidate site in response to determining that the anticipated accuracy of detection value satisfies the target accuracy of detection value.

2. The method of claim 1, further comprising:
    receiving, by the network device via the interactive graphical user interface, one or more modifications directed to at least one of the one or more assets or the geo-location parameters for the one or more virtual video cameras in response to determining that the anticipated accuracy of detection value does not satisfy the target accuracy of detection value.

3. The method of claim 1, further comprising:
    calculating, by the network device, the one or more fields of view for the one or more virtual video cameras based on the map information, the geo-location parameters, and video camera characteristic information pertaining to the one or more video cameras.

4. The method of claim 1, further comprising:
    receiving, by the network device via the interactive graphical user interface, an input that defines a boundary for the service area or the portion of the service area.

5. The method of claim 1, further comprising:
    downloading, by the network device subsequent to the using, the geo-location parameters to the one or more video cameras that are installed at the candidate site;
    receiving, by the network device, one or more video feeds of the service area from the one or more video cameras at the candidate site; and
    annotating, by the network device, the one or more video feeds.

6. The method of claim 5, further comprising:
    calculating, by the network device, an accuracy of detection value based on the annotating.

7. The method of claim 6, further comprising:
    updating, by the network device, the regression model based on the accuracy of detection value and the annotating.

8. The method of claim 1, wherein the map information includes a three-dimensional map of the candidate site, and wherein the target accuracy of detection value represents an amount of coverage of the service area or a portion of the service area that supports the service to be provided at the candidate site.

9. A network device comprising:
    a communication interface;
    a memory, wherein the memory stores instructions; and
    a processor, wherein the processor executes the instructions to:
        store a regression model that stores data associated with parameters derived from previously installed and tested video cameras at sites;
        obtain location information of a candidate site at which a service is to be provided in a service area based on an installation of one or more video cameras;
        obtain map information of the candidate site that includes the service area;
        display, via an interactive graphical user interface, the map information;
        receive, via the interactive graphical user interface, one or more selections of one or more assets in the map information at which one or more virtual video cameras are to be virtually affixed;
        receive, via the interactive graphical user interface, geo-location parameters for the one or more virtual video cameras to be virtually affixed, wherein the geo-location parameters include location, height, heading, pitch, and roll;
        calculate an anticipated accuracy of detection value for the service area or a portion of the service area based on the geo-location parameters, the regression model, the map information, and one or more fields of view for the one or more virtual video cameras;
        determine, subsequent to the calculation, whether the anticipated accuracy of detection value satisfies a target accuracy of detection value for the candidate site; and
        use the geo-location parameters to install and test the one or more video cameras at the candidate site in response to a determination that the anticipated accuracy of detection value satisfies the target accuracy of detection value.

10. The network device of claim 9, wherein the processor further executes the instructions to:
    receive, via the interactive graphical user interface, one or more modifications directed to at least one of the one or more assets or the geo-location parameters for the one or more virtual video cameras in response to determining that the anticipated accuracy of detection value does not satisfy the target accuracy of detection value.

11. The network device of claim 9, wherein the processor further executes the instructions to:
    calculate the one or more fields of view for the one or more virtual video cameras based on the map information, the geo-location parameters, and video camera characteristic information pertaining to the one or more video cameras.

12. The network device of claim 9, wherein the processor further executes the instructions to:
receive, via the interactive graphical user interface, an input that defines a boundary for the service area or the portion of the service area.

13. The network device of claim 9, wherein the processor further executes the instructions to:
download, via the communication interface subsequent to the using, the geo-location parameters to the one or more video cameras that are installed at the candidate site;
receive, via the communication interface, one or more video feeds of the service area from the one or more video cameras at the candidate site; and
annotate the one or more video feeds.

14. The network device of claim 13, wherein the processor further executes the instructions to:
calculate an accuracy of detection value based on the annotation.

15. The network device of claim 14, wherein the processor further executes the instructions to:
update the regression model based on the calculation of the accuracy of detection value and the annotation.

16. The network device of claim 9, wherein the map information includes a three-dimensional map of the candidate site, and wherein the target accuracy of detection value represents an amount of coverage of the service area or a portion of the service area that supports the service to be provided at the candidate site.

17. A non-transitory computer-readable storage medium storing instructions executable by a processor of a device, which when executed cause the device to:
store a regression model that stores data associated with parameters derived from previously installed and tested video cameras at sites;
obtain location information of a candidate site at which a service is to be provided in a service area based on an installation of one or more video cameras;
obtain map information of the candidate site that includes the service area;
display, via an interactive graphical user interface, the map information;
receive, via the interactive graphical user interface, one or more selections of one or more assets in the map information at which one or more virtual video cameras are to be virtually affixed;
receive, via the interactive graphical user interface, geo-location parameters for the one or more virtual video cameras to be virtually affixed, wherein the geo-location parameters include location, height, heading, pitch, and roll;
calculate an anticipated accuracy of detection value for the service area or a portion of the service area based on the geo-location parameters, the regression model, the map information, and one or more fields of view for the one or more virtual video cameras;
determine, subsequent to the calculation, whether the anticipated accuracy of detection value satisfies a target accuracy of detection value for the candidate site; and
use the geo-location parameters to install and test the one or more video cameras at the candidate site in response to a determination that the anticipated accuracy of detection value satisfies the target accuracy of detection value.

18. The non-transitory computer-readable storage medium of claim 17, wherein the instructions further comprise instructions to:
receive, via the interactive graphical user interface, one or more modifications directed to at least one of the one or more assets or the geo-location parameters for the one or more virtual video cameras in response to determining that the anticipated accuracy of detection value does not satisfy the target accuracy of detection value.

19. The non-transitory computer-readable storage medium of claim 17, wherein the instructions further comprise instructions to:
calculate the one or more fields of view for the one or more virtual video cameras based on the map information, the geo-location parameters, and video camera characteristic information pertaining to the one or more video cameras.

20. The non-transitory computer-readable storage medium of claim 17, wherein the instructions further comprises instructions to:
download, subsequent to the using, the geo-location parameters to the one or more video cameras that are installed at the candidate site;
receive one or more video feeds of the service area from the one or more video cameras at the candidate site;
annotate the one or more video feeds;
calculate an accuracy of detection value based on the annotation; and
update the regression model based on the calculation of the accuracy of detection value and the annotation.

* * * * *